(12) United States Patent
Teramoto et al.

(10) Patent No.: US 8,711,305 B2
(45) Date of Patent: Apr. 29, 2014

(54) LIQUID CRYSTAL DISPLAY APPARATUS

(75) Inventors: Hiroshi Teramoto, Tokyo (JP);
Takahiro Ueno, Kumamoto (JP)

(73) Assignee: Mitsubishi Electric Corporation,
Tokyo (JP)

( * ) Notice: Subject to any disclaimer, the term of this patent is extended or adjusted under 35 U.S.C. 154(b) by 125 days.

(21) Appl. No.: 13/435,659

(22) Filed: Mar. 30, 2012

(65) Prior Publication Data
US 2012/0257151 A1   Oct. 11, 2012

(30) Foreign Application Priority Data

Apr. 7, 2011   (JP) ................................. 2011-085549

(51) Int. Cl.
*G02F 1/1333*   (2006.01)
(52) U.S. Cl.
USPC .............................. 349/110; 349/40; 349/150
(58) Field of Classification Search
None
See application file for complete search history.

(56) References Cited

U.S. PATENT DOCUMENTS

| 6,525,786 B1* | 2/2003 | Ono ................................. 349/40 |
| 7,864,284 B2 | 1/2011 | Morii et al. |
| 2006/0290830 A1 | 12/2006 | Teramoto et al. |
| 2010/0289992 A1* | 11/2010 | Nojiri et al. ................... 349/106 |

FOREIGN PATENT DOCUMENTS

| JP | 6-3689 | 1/1994 |
| JP | 2008-145462 | 6/2008 |
| JP | 2008-203448 | 9/2008 |
| JP | 2010-191097 | 9/2010 |

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

A liquid crystal display apparatus includes: a color filter substrate including a first transparent, which has: an antistatic transparent conductive layer; and a light shield layer that shields light; a TFT substrate including a second transparent substrate facing the color filter substrate, and which has: a projecting part that projects beyond an end face of the color filter substrate; a conductive tape, which is stuck from an upper part of the color filter substrate to an upper part of the TFT substrate, wherein the light shield layer has a notch having an opening at the end side of the color filter substrate, wherein the conductive tape is arranged adjacent to or partially overlapping with the light shield layer, wherein the notch is provided at a connection part, and wherein a light transmission part capable of light transmitting is provided to the connection part.

12 Claims, 12 Drawing Sheets

DISPLAY AREA 200
(ADJACENCY OF TFT 114)

FRAME AREA 190
(ADJACENCY OF EARTH PAD 117)

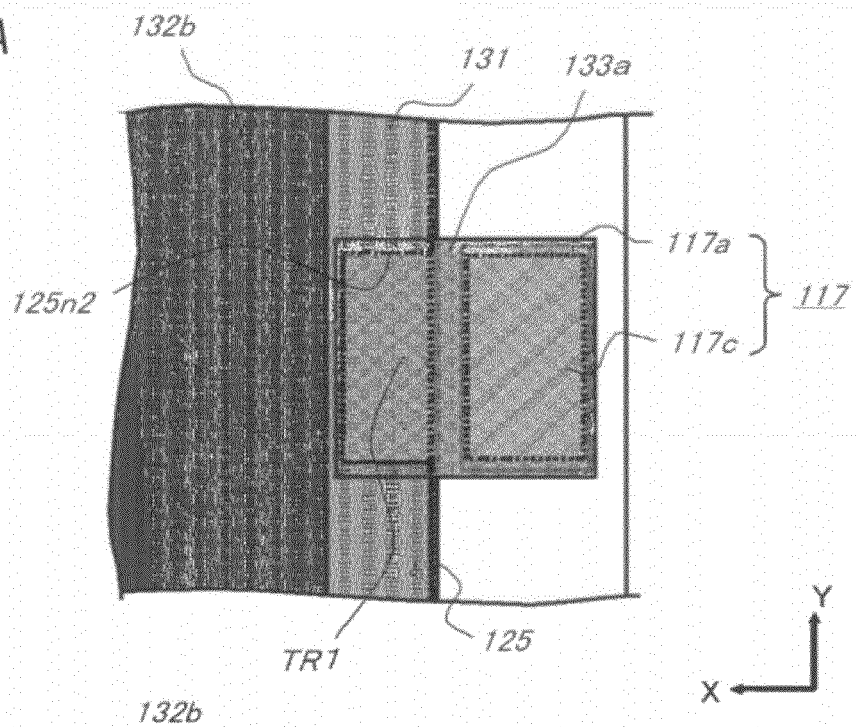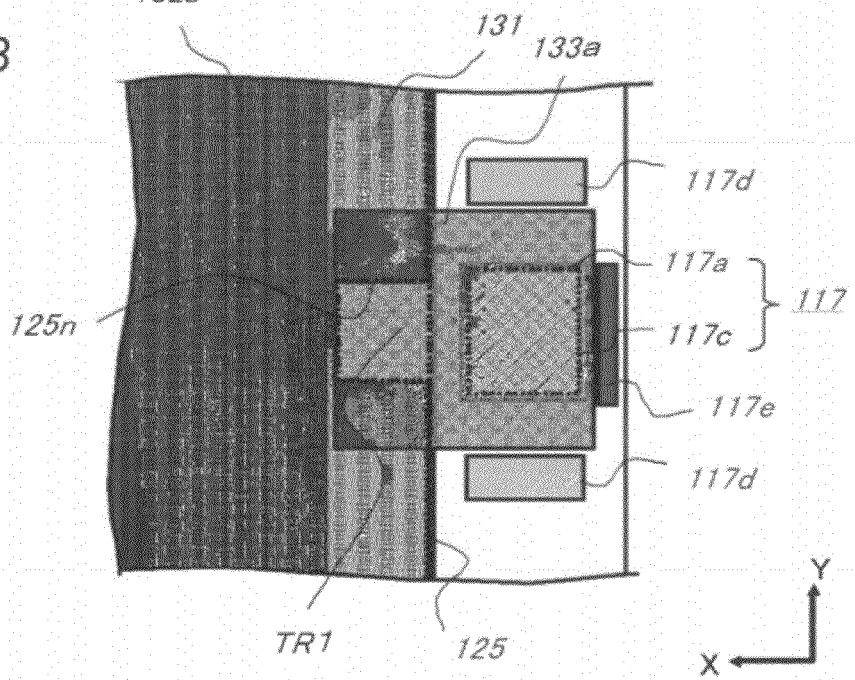

LIQUID CRYSTAL DISPLAY APPARATUS

CROSS-REFERENCE TO RELATED APPLICATION

This application claims priority from Japanese Patent Application No. 2011-085549 filed on Apr. 7, 2011, the entire subject matter of which is incorporated herein by reference.

TECHNICAL FIELD

This disclosure relates to an electrical connection structure of a liquid crystal display apparatus.

BACK GROUND

In recent years, a liquid crystal display apparatus of a horizontal electric field type, which is also referred to as In-Plane Switching (IPS) type or Fringe Field Switching (FFS) type, has been focused. In these types, a direction of an electric field to be applied to liquid crystals is substantially parallel with a substrate surface, and a merit in that viewing characteristics may be improved, compared to a Twisted Nematic (TN) type. In the horizontal electric field type liquid crystal display apparatus, a liquid crystal are sandwiched between a pair of substrates arranged to face each other, a pair of electrodes is arranged on a TFT substrate that is one of substrates and an electric field driving the liquid crystals is generated between the electrodes. Accordingly, in a general configuration, an electrode (opposite electrode) driving the liquid crystals, which is provided in the TN type and the like, is not provided on the color filter substrate that is the other of substrates. As a result, a charge-up is caused due to static electricity that is applied to the color filter substrate from the outside of the liquid crystal display apparatus, so that display defects are apt to be generated. With taking into consideration that, in the horizontal electric field type liquid crystal display apparatus, a configuration, in which a transparent conductive film serving as a shield layer such as Indium Tin Oxide (ITO) is formed on an outer surface of the color filter substrate that is apt to be influenced by the charge-up, and a configuration, in which an adhesive of a polarization plate is formed of a conductive layer, are adopted, and then the shield layer is earth-connected to a housing and the like, so that the static electricity accumulated by the charge-up is to be discharged.

Regarding the earth connection structure of the shield layer, JP-A-2010-191097 discloses a method of directly sticking a wiring such as Flexible Flat Cable (FFC), which is earth connected to the housing and the like, to the shield layer (which is referred to as—static transparent electrode in JP-A-2010-191097) via an anisotropic conductive film. Also, JP-A-2008-203448 discloses a method of sticking and connecting a conductive tape and the like crossing over the earth-connected wiring such as FFC and the shield layer. Alternatively, JP-A-2008-145462 discloses a method of arranging an earth pad (which is referred to as a ground pad in JP-A-2008-145462), to which the earth-connected wiring such as FFC is once connected, on the TFT substrate and arranging a conductive paste, which is such as silver paste formed by application, a stuck conductive tape and the like crossing over the earth pad and the shield layer.

The JP-A-2008-145462 further discloses a method, which is an improvement on the connection, of arranging a spacer between a connection part of the conductive tape and the shield layer and a mount part of an IC chip driving the liquid crystal display apparatus, and the spacer functions as a barrier to suppress a protective material such as resin, which is applied so as to protect the IC chip, from spreading to the connection part. Also, although the terminal connection structure is not an earth connection structure of a shield layer, JP-A-H6-3689 discloses a method of arranging a partial transparent area in a terminal area made of a metal thin film so as to perform a non-destructive appearance inspection in a terminal connection structure in which an anisotropic conductive film is interposed at a mount part of the FFC for driving a liquid crystal panel.

SUMMARY

Specifically, as described in JP-A-2008-145462, the structure in which the earth pad and the shield layer are electrically connected by the conductive tape enables a thinner apparatus and a slimmer frame, compared to a method of applying the conductive paste and the like. In addition, the above structure does not require a thermal compression process, so that the adhesion is easier, compared to the configuration in which the connection is made by the anisotropic conductive film, as disclosed in JP-A-2010-191097 or JP-A-2008-145462. However, in recent years, since the slim frame is strongly required for the liquid crystal display apparatus, it is necessarily required to narrow a part of the shield layer exposed from the polarization plate. As a result, a substantial adhesion area between the shield layer and the conductive tape is reduced in the connection structure using the conductive tape, so that a problem due to a conduction defect may occurs. Also, in order to suppress the conduction defect, a precise positioning is required at the time of adhesion of the conductive tape and results in takt up at the time of connection. Even if the strong connection such as thermal compression, by which the anisotropic conductive film is used as disclosed in JP-A-2010-191097 or JP-A-H3-3689, is used in a viewpoint that the connection using conductive adhesive such as conductive tape is insufficient, it is necessary to add the thermal compression process, which also results in the takt up. In any case, in order to suppress the conduction defect due to the slimmed frame, the takt up problem is instead caused. Additionally, in the liquid crystal display apparatus having the slimmed frame, with respect to a light shield layer arranged to suppress light leakage in a frame area adjacent to a display area, extraction wirings that are arranged in a high density and the terminal structure such as earth pad, a metal terminal pad and the like is provided at a lower layer so as to suppress the transparent conductive film arranged on a superficial layer from being peeled off or to stabilize the connection. According to the metal terminal pad, in general, the substrates cannot enable the light to penetrate therethrough at the connection parts between the conductive tape and the earth pad or shield layer on the respective substrates. As a result, during the manufacturing process, it is not possible to observe or examine the connection state with the conductive tape, and it is one cause of the conduction defect. Further, in the liquid crystal display apparatus having the slimmed frame, the adhesion area of the conductive tape is reduced and the minute conductive tape having a size of several mm in height and width is stuck, so that the sticking operation is more difficult, which causes the conduction defect and the takt up problem regarding the positioning. Furthermore, when the conductive tape is minute, the connection part is also minute and it is difficult to check whether the adhesion position is correct or not and to observe the connection state with the conductive tape. As a result, the conduction defect is apt to be caused.

As described above or as indicated in some of the related arts, the conduction defect including the reliability problem occurring at the connection part with the shield layer cannot be easily solved because the various causes are included complexly. Further, when the takt up problem is also included, it is not possible to achieve the effective solutions by the conventional arts including the related arts. Also, the problem of the connection structure is not limited to the shield layer that is used in the horizontal electric field type liquid crystal display apparatus and occurs also in a liquid crystal display apparatus using a pair of transparent substrates overlapping with each other. Specifically, in a configuration using an electrical connection structure that conducts between conductive layers such as electrodes formed on the respective transparent substrates via the conductive tape, the similar problem may be caused depending on circumstances.

With taking into consideration the above, this disclosure provides at least a liquid crystal display apparatus and a horizontal electric field type liquid crystal display apparatus capable of realizing high reliability, high productivity, thinning, slimmer frame and the like effects.

In view of the above, a liquid crystal display apparatus of this disclosure comprises: a color filter substrate including a first transparent, which has: an anti-static transparent conductive layer formed in at least a display area on a first surface of the first transparent substrate; and a light shield layer that shields light in a frame area arranged outside the display area on a second surface, which is opposite to the first surface; a TFT substrate including a second transparent substrate, which maintains liquid crystals in cooperation with the color filter substrate with facing the second surface of the color filter substrate, and which has: a projecting part that projects beyond an end face of the color filter substrate; a pair of electrodes, which is provided in the display area on a third surface facing the color filter substrate, and which generates an electric field in a direction parallel with the color filter substrate to drive the liquid crystals; a TFT, which is provided in the display area provided on a third surface, and which apply the voltage into one of the pair of electrodes; and an earth pad, which is provided in the projecting part on the third surface, and which is earth-connected; and a conductive tape, which is stuck from an upper part of the color filter substrate to an upper part of the TFT substrate, which is connected to both the anti-static transparent conductive layer and the earth pad to electrically connect the anti-static transparent conductive layer and the earth pad, wherein the light shield layer is formed to extend up to an end side of the color filter substrate, which is adjacent to the projecting part, wherein the light shield layer has a notch having an opening at the end side of the color filter substrate, which is adjacent to the projecting part, wherein the conductive tape is arranged adjacent to or partially overlapping with the light shield layer, wherein the notch is provided at a connection part of the conductive tape and the anti-static transparent conductive layer, and wherein a light transmission part capable of light transmitting is provided to the connection part, and a part of the TFT substrate overlapping with the connection part has transparency.

According to the liquid crystal display apparatus using a pair of transparent substrates overlapping with each other, it is possible to secure a stable electrical connection structure that achieves conduction between conductive layers such as electrodes formed on the respective transparent substrates.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 11A and 11B are plan views illustrating an adjacency of a conductive tape connection part in a modified embodiment of the first illustrative embodiment of this disclosure;

DETAILED DESCRIPTION

[First Illustrative Embodiment]

Figure 1:
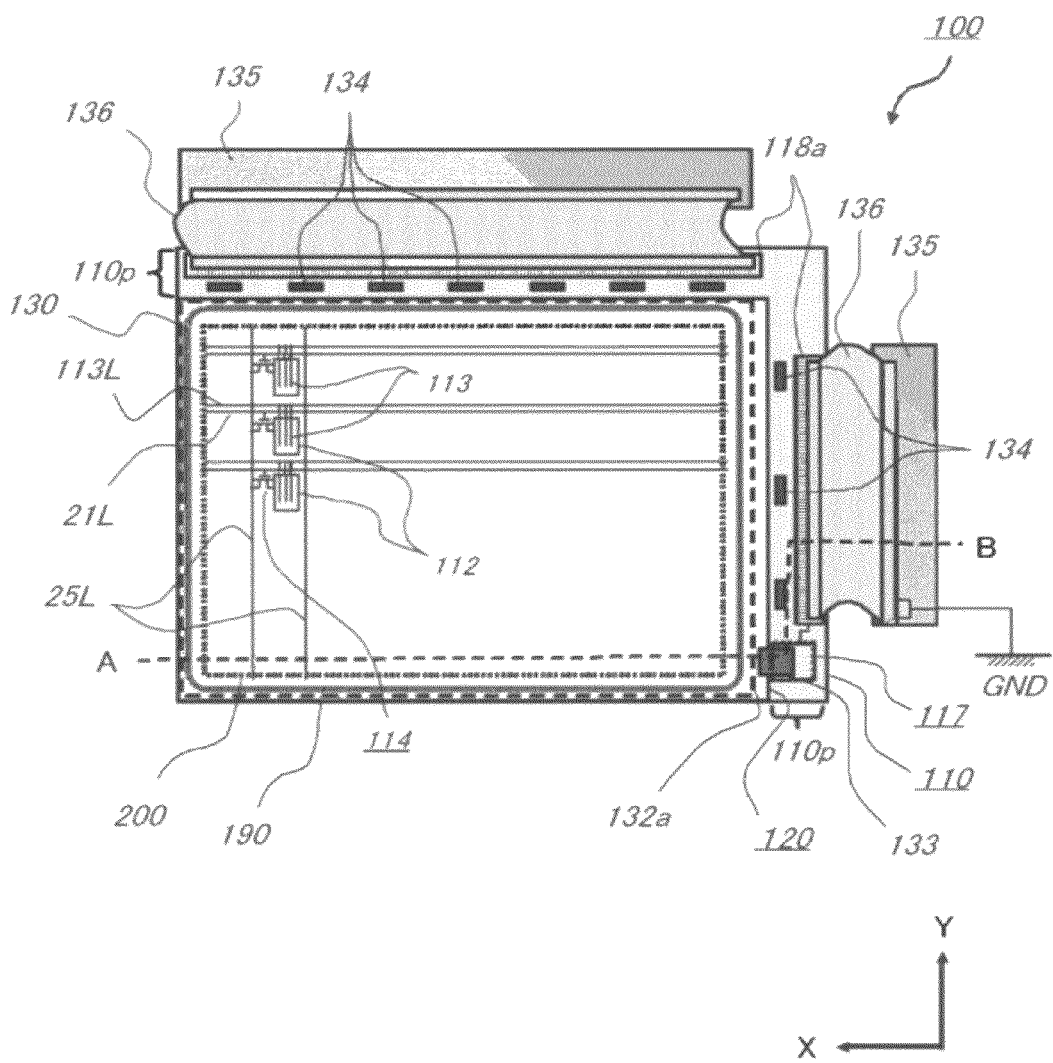
FIG. 1 is a plan view illustrating a liquid crystal panel in a liquid crystal display apparatus of a first illustrative embodiment of this disclosure.
Figure 2:
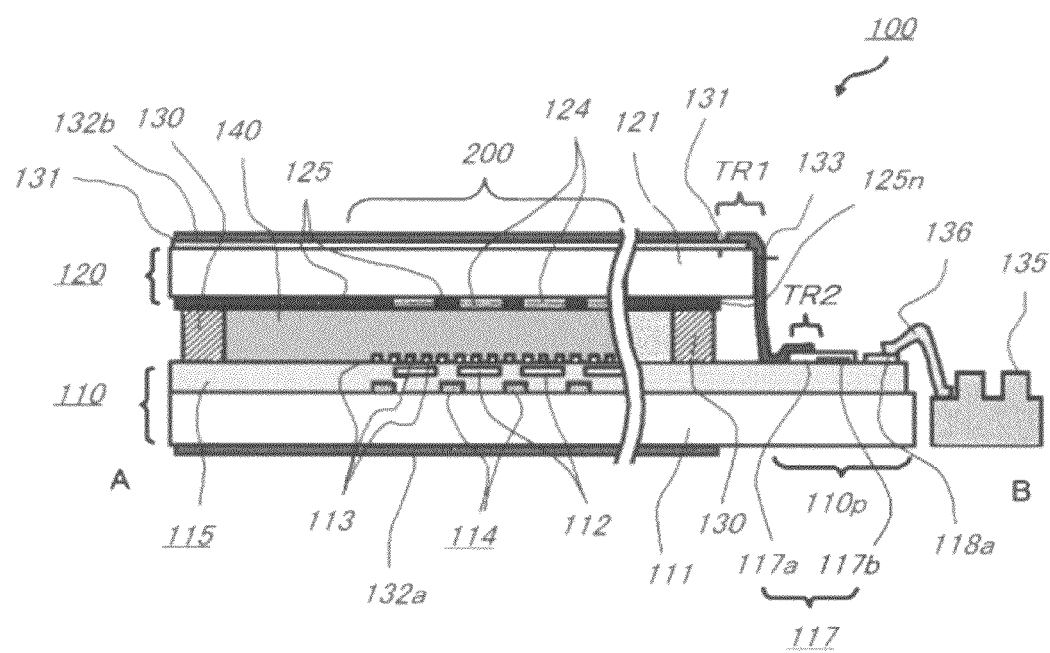
FIG. 2 is a sectional view illustrating the liquid crystal panel in the liquid crystal display apparatus of the first illustrative embodiment of this disclosure.

FIGS. 1 and 2 are views schematically illustrating a liquid crystal panel configuring a liquid crystal display apparatus according to a first illustrative embodiment of this disclosure. Hereinafter, a configuration of the liquid crystal panel will be described with reference to FIGS. 1 and 2. FIG. 1 is a plan view illustrating the entirety of the liquid crystal panel, and FIG. 2 is a sectional view taken along a line A-B of FIG. 1. In the meantime, the drawings are pictorial and do not reflect the exact sizes and the like of the shown elements. In addition, parts other than main parts of this disclosure are omitted or parts of the configuration are simplified to simply show the drawings. Also, in the drawings, the same elements as those in preceding drawings are indicated with the same reference numerals and the descriptions thereof are omitted.

Here, an example is described in which this disclosure is applied to a horizontal electric field type liquid crystal panel, in which a TFT (Thin Film Transistor) is used as a switching device, specifically to an FFS (Fringe Field Switching) type liquid crystal panel. As shown in FIGS. 1 and 2, a liquid crystal panel 100 includes a TFT substrate 110 that has TFTs as switching devices, a color filter substrate 120 that is an opposite substrate positioned to face the TFT substrate 110 and having a display area 200 for displaying an image, and a seal material 130 that is arranged to surround an area corresponding to the display area 200 and seals a gap between the TFT substrate 110 and the color filter substrate 120. Also, a plurality of pillar-shaped spacers (not shown) that forms and maintains a predetermined gap between the substrates is arranged in the display area 200 between the TFT substrate 110 and the color filter substrate 120. A liquid crystal layer 140 is sandwiched in an area corresponding to at least the display area 200 of the gap between the TFT substrate 110 and the color filter substrate 120 maintained by the pillar-shaped spacers, and is sealed by the seal material 130. The seal material 130 is formed in a frame area 190 that is arranged outside the area corresponding to the display area 200. Also, the TFT substrate 110 and the color filter substrate 120 have a rectangular outline, respectively. The TFT substrate 110 has an overall size larger than that of the color filter substrate 120 and overlaps with the color filter substrate 120 with remaining a projecting part 110p, which partially projecting from a outline end face of the color filter substrate 120. The projecting part 110p of the TFT substrate 110, which partially protrudes from the outline end face of the color filter substrate 120, is also arranged in the frame area 190. Meanwhile, the frame area 190 means an area corresponding to a frame positioned outside and surrounding the display area 200, on the TFT substrate 110 of the liquid crystal panel 100, on the color filter substrate 120 or in the area sandwiched between both the substrates, i.e., all areas except for the display area 200. Also, the display area 200 means an area to display, on the TFT substrate 110 of the liquid crystal panel 100, on the color filter substrate 120 or in an area sandwiched between both the substrates.

The color filter substrate 120 has an orientation film (not shown) for orienting liquid crystals in an area corresponding to the display area 200 on one surface of a glass substrate 121 that is a first transparent substrate, color filters 124 provided below the orientation film and a light shield layer 125 for light-shielding between the color filters 124 or for light-shielding the frame area 190 arranged outside the area corresponding to the display area 200. The color filters 124 may be configured by color material layers, in which pigments are dispersed in resins. The color filters function as filters that enable lights having specific wavelength ranges such as red, green, blue and the like to selectively penetrate therethrough and then the color filters are configured as the color material layers of different colors are regularly arranged. The light shield layer 125 is also arranged in the frame area 190 outside the display area 200 as well as between the color filters 124, is formed over the substantially entire area of the frame area 190 of the color filter substrate 120 and shields the light transmission into the color filter substrate 120 in the frame area 190 that is not necessary for display. Regarding the light shield layer 125, a metal-based material using chromium oxide and the like, a resin-based material having black particles dispersed in a resin, and the like may be used. In the meantime, an overcoat layer made of a transparent resin film and covering the color filters 124 and the light shield layer 125 may be provided below the orientation film.

Also, the color filter substrate 120 has an anti-static transparent conductive layer 131 to be earth-connected on the other surface of the glass substrate 121. The anti-static transparent conductive layer 131 is provided to cover at least the display area 200 of the glass substrate 121 and is effective in suppressing the charge due to the static electricity or display defects due to an external electric field in the horizontal electric field type liquid crystal panel. Additionally, a polarization plate 132b is provided at an upper layer of the anti-static transparent conductive layer 131. The polarization plate 132b is arranged to cover the anti-static transparent conductive layer 131 in at least the display area 200 and is arranged to extend to an adjacency of an end side (−X direction in FIG. 1), at which the projecting part 110p of the TFT substrate 110 partially projecting from the outline end face of the color filter substrate 120 is arranged. Then, an exposed part of the anti-static transparent conductive layer 131, which is not covered by the polarization plate 132b, is formed at an outer part of the polarization plate 132b. The exposed part of the anti-static transparent conductive layer 131, which is not covered by the polarization plate 132b, is formed to have a predetermined uniform width along the outline end face of the color filter substrate 120. A specific width of the exposed part or a distance from the outline end face of the color filter substrate 120 to an end portion of the polarization plate 132 is about 1.0 mm in the first illustrative embodiment. Also, regarding the color filter substrate 120 of the first illustrative embodiment, as described above, the light shield layer 125 is formed over the substantially entire area of the frame area 190 of the color filter substrate 120, is formed to extend to the end side of the color filter substrate 120 at the side at which the projecting part 110p of the TFT substrate 110 is arranged, when seen from a plan view, and then the light shield layer 125 is provided with a notch 125n having an opening at the end side at which the projecting part 110p is arranged. Meanwhile, the plan view means a position, a line or a pattern that is orthogonally projected on one plane (XY plane in the specification) parallel to the substrate surface and basically corresponds to a position, a line or a pattern on each plan view. These meaning are used in the same meaning in the specification.

On the other hand, the TFT substrate 110 has: an orientation film (not shown) for orienting liquid crystals in an area corresponding to the display area 200 on a surface of a glass substrate 111 that is a second transparent substrate and facing the color filter substrate 120; pixel electrodes 112 and opposing electrodes 113, which respectively configure a pair of electrodes provided below the orientation film, generating an electric field in a direction parallel with the substrate surface of the TFT substrate 110 or color filter substrate 120 and applying a voltage for driving the liquid crystals; TFTs 114 that are switching devices for supplying a voltage to the pixel electrodes 112 of the pair of electrodes; an insulation film 115 that covers the TFTs 114; a plurality of gate wirings 21L and source wirings 25L, which are wirings for supplying signals to the TFTs 114; gate electrodes (not shown); and source/drain electrodes (not shown) connected to the wirings and configuring the TFTs 114, and the like. In the meantime, in the first illustrative embodiment, regarding the pixel electrodes 112 and the opposing electrodes 113, which are the pairs of electrodes applying the voltage for driving the liquid crystals, the pixel electrodes 112 that are one of electrodes are configured by a transparent conductive film pattern having a flat plate shape. The opposing electrodes 113 that are the other of electrodes are configured by a transparent conductive film pattern having an opening of a pectinate shape or slit shape having a plurality of slits arranged in parallel with each other and overlap with the pixel electrodes 112 via the insulation layer. Also, the above configuration is not necessarily required. For example, the shapes and arrangements of the pixel electrodes 112 and the opposing electrodes 113 may be configured in the opposite way. That is, the pixel electrodes 112 may be configured by a pattern having an opening of a pectinate shape or slit shape having a plurality of slits arranged in parallel with each other and may be arranged above the opposing electrodes 113, the opposing electrodes 113 may be configured by a pattern having a flat plate shape and may be configured below the pixel electrodes 112, and the TFTs 114 may be connected to the pixel electrodes 112 configured by the pattern having an opening of a pectinate shape or slit shape having a plurality of slits arranged in parallel with each other and may apply the voltage to the pixel electrodes. In the meantime, the specific planar pattern shapes of the pixel electrodes 112 and the opposing electrodes 113 are not shown. However, planar pattern shapes of pixel electrodes and opposing electrodes, which are used in a well-known FFS type liquid crystal panel, may be adopted. Additionally, the insulation film 115 that is an insulation film configuring the TFT substrate 110 or an insulation film that is formed between the pixels electrodes 112 and the opposing electrodes 113 may be a transparent insulation film of a single layer or a stacked film of a plurality of transparent insulation films. Also, as schematically shown in FIG. 1, the gate wirings 21L and the source wirings 25L formed in the display area 200 are respectively arranged in parallel and are also arranged to intersect with each other. Also, the pixel electrodes 112, the TFTs 114 and the gate electrodes and the source/drain electrodes configuring the TFTs 114 are arranged in an array shape in correspondence to pixel areas surrounded by the gate wirings 21L and the source wirings 25L intersecting with each other. Also, the same number of common wirings 113L as the gate wirings 21L, which supply a common potential to the opposing electrodes 113, is arranged in parallel with the gate wirings 21L, and is connected to the opposing electrodes 113 in the respective pixel areas, and then it makes all potentials of the opposing electrodes of the respective pixel areas becomes the same with the common potential. Also, the other surface of the glass substrate 111, which is opposite to the surface on which the electrodes and the wirings are formed, is provided with a polarization plate 132a. The polarization plate 132a is configured by a polarization plate that is made of the same material as the polarization plate 132b, and is arranged to cover at least the display area 200 of the surface of the glass substrate 111.

Also, signal terminals 118a, 118b that receive signals, which are supplied to the TFTs 114, from the outside are provided in the frame area 190 on the TFT substrate 110, specifically, on a surface of the projecting part 110p partially projecting from the end face of the color filter surface 120, which surface faces the side at which the color filter substrate 120 is arranged. At least surfaces of the signal terminals 118a, 118b are configured by a transparent conductive film. The signal terminals 118a, 118b are integrally shown in the drawings. However, a plurality of rectangular pads separated in correspondence to a plurality of signals and having a longitudinal direction in the X direction is arranged in the Y direction.

Further, the respective pads of the signal terminals 118a are connected with control substrates 135 having control Integrated Circuit (IC) chips mounted thereon, which generate control signals for controlling driving ICs, via Flexible Flat Cables (FFC) 136 being connection wirings. Additionally, the respective pads of the signal terminals 18b are connected with driving IC chips 134. In addition, the input-side signal terminals 118b of the driving IC chips 134 are connected with the signal terminals 118a, to which the control substrates 135 are connected, by signal extraction wirings 119a, and then the control signals from the control substrates 135 are input to the driving IC chips 134. Meanwhile, the output-side signal terminals 118b of the driving IC chips 134 are connected with the signal extraction wirings 119a extracted from the display area 200, and output signals from the driving IC chips 134 are supplied to the TFTs 114 in the display area 200.

Also, an earth pad 117, which is earth-connected to the outside via the signal terminals 118b and the FFC 136, is provided in the frame area 190 of the TFT substrate 110, specifically, on the surface of the projecting part 110p partially projecting from the end face of the color filter surface 120, which surface faces the color filter substrate 120. Likewise the signal terminals 118a, 118b, at least a surface of the earth pad 117 is configured by a transparent conductive film. Also, the anti-static transparent conductive layer 131 formed on the surface of the color filter substrate 120 is connected to the earth pad 117 via a conductive tape 133 that is stuck from the upper part of the color filter substrate 120 to the upper part of the TFT substrate 110 with crossing over, and is earth-connected via the signal terminals 118b and the FFC 136 sequentially. Regarding the conductive tape 133, a tape having a conductive adhesive applied on a base material made of a metal foil such as Al or Cu foil may be used, or a conductive tape of a general commercial product may be used. A conductive tape of a general commercial product is cut to prepare the conductive tape 133. Accordingly, the non-uniformity is caused regarding the specific size of the conductive tape 133. However, the conductive tape of a rectangular shape having a width of about 3 mm in the longitudinal direction (width in the X direction in the drawings) and a width of about 5 mm in the width direction (width in the Y direction in the drawings) is used in this illustrative embodiment. In the first illustrative embodiment, the outline end face of the conductive tape 133 is used as a basis of the positioning. Therefore, regarding the parallelism of the opposing sides of the rectangular shape or correctness of angles which are angles of four corners as a right angle, it is preferable to prepare the conductive tape 133 of the rectangular shape by cutting processing having secured some degree of accuracy. Also, as described above, the conductive tape 133 is connected to the exposed part of the anti-static transparent conductive layer 131, which is not covered by the polarization plate 132b, and the exposed part is provided at the side (–X direction in FIG. 1), at which the projecting part 110p provided with the earth pad 117 is provided, of the sides (–X or +Y direction in FIG. 1) at which the projecting part 110p of the TFT substrate 110 is arranged.

Figure 3:
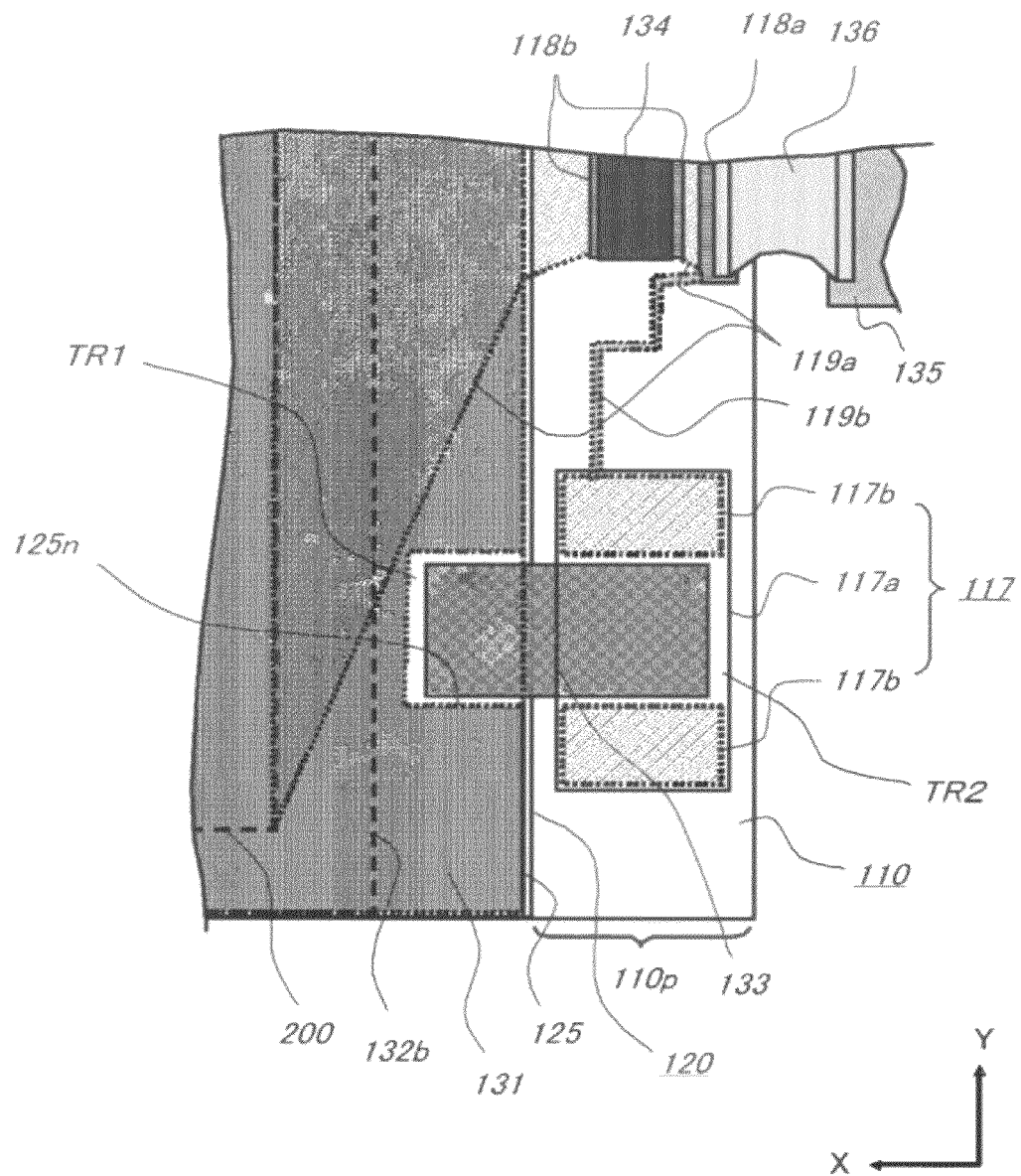
FIG. 3 is a plan view illustrating an earth pad adjacency in the liquid crystal display apparatus of the first illustrative embodiment of this disclosure.

In the below, the connection structure between the conductive tape 133 and the anti-static transparent conductive layer 131 on the color filter substrate 120 or the connection structure between the conductive tape and the earth pad 117 of the TFT substrate 110 is more specifically described with reference to FIG. 3 showing an adjacency of the earth pad 117. First, the conductive tape 133 is stuck and thus contacted and electrically connected to the surface of the anti-static transparent conductive layer 131 on the color filter substrate 120. More specifically, the conductive tape 133 is connected to the anti-static transparent conductive layer 131 via the conductive adhesive applied to the conductive tape. As describing the specific positional relation in detail, the conductive tape 133 is stuck to a part of the notch 125n having an opening at the end side, which is formed at the light shield layer 125 of the color filter substrate 120. In other words, the notch 125n is provided to the connection part of the conductive tape 133 and the anti-static transparent conductive layer 131. As a result, since the color filter substrate 120 enables the light to penetrate therethrough at the notch 125n part, a light transmission part TR1 capable of light transmitting is provided to the connection part of the anti-static transparent conductive layer 131 and the conductive tape 133. In the first illustrative embodiment, end faces of the notch 125n are formed along the outline end faces of the conductive tape 133 and the conductive tape 133 is arranged only at an inner side of the end faces of the notch 125n without overlapping with the light shield layer 125, when seen from a plan view. In other words, the light shield layer 125 does not overlap with the connection part of the conductive tape 133 and the anti-static transparent conductive layer 131. Also, a pair of opposing end faces of the notch 125n is arranged so that they are parallel with and close to two opposing end faces of the conductive tape 133, which are parallel with each other in the longitudinal direction of the outline of the conductive tape 133, and then the conductive tape 133 is sandwiched from both sides. More specifically, the notch 125n has a pair of opposing end faces, which is spaced from each other by the similar distance (for example, 3.5 mm) as the width of the conductive tape 133, i.e., about 3 mm, (width in the Y direction).

In the meantime, the earth pad 117 on the TFT substrate 110 has a transparent conductive film 117a that is a transparent conductive layer for earth pad and conductive light shield layers 117b that partially overlap with the transparent conductive layer for earth pad. The conductive tape 133 is stuck and thus contacted and electrically connected to a surface of the transparent conductive film 117a configuring a surface of the earth pad 117. More specifically, the conductive tape 133 is connected to the transparent conductive film 117a via the conductive adhesive applied to the conductive tape. Also, the conductive light shield layers 117b that are arranged at a lower layer of the transparent conductive film 117a do not overlap with the connection part of the conductive tape 133 and the transparent conductive film 117a configuring the earth pad 117, and the connection part of the conductive tape 133 and the transparent conductive film 117a is arranged at a part that is configured by only the transparent conductive film 117a. As a result, a light transmission part TR2 capable of light transmitting is also provided to the connection part of the conductive tape 133 and the transparent conductive film 117a configuring the earth pad 117. Also, when seen from a plan view, the outline end face of the conductive light shield layer 117b (a boundary between the conductive light shield layer 117b and the light transmission part TR2) is formed along the outline end face of the conductive tape 133. More specifically, the pair of conductive light shield layers 117b is arranged so that they are parallel with and close to two opposing sides of the outline end face of the conductive tape 133, which are parallel with each other in the longitudinal direction of the conductive tape, and sandwich the conductive tape 133 from both sides. In other words, the pair of conductive light shield layers 117b has a pair of opposing end faces, which is spaced from each other by the similar distance (for example, 3.5 mm) as the width of the conductive tape 133, i.e., about 3 mm (width in the Y direction). Also, in addition to the pad provided so as to supply the signal to the TFTs 114 in the display area 200, the pad of the signal terminal 118a has at least one pad that is earth-connected to the outside, and then the earth-connected pad is connected to the earth pad 117 by an earth extraction wiring 119b. More specifically, the earth extraction wiring 119b has an integral pattern in a shape extracted from the conductive light shield layer 117b by the same metal material as the conductive light shield layer 117b configuring the earth pad 117.

In the meantime, when the signal extraction wiring 119a or earth extraction wiring 119b is arranged adjacent to or partially overlaps with the connection part of the transparent conductive film 117a or anti-static transparent conductive layer 131 and the conductive tape 133, the signal extraction wiring 119a or earth extraction wiring 119b is preferably bypass-formed so that the light transmission part TR1 capable of light transmitting is formed at the connection part of the conductive tape 133 and the anti-static transparent conductive layer 131 and the light transmission part TR2 capable of light transmitting is formed at the connection part of the conductive tape 133 and the earth pad 117. In the first illustrative embodiment, the signal extraction wiring 119a is formed to bypass the connection part of the conductive tape 133 and the anti-static transparent conductive layer 131 by adopting a configuration of the wiring area having a taper shape, which is not straightly extracted in a vertical direction from the end side of the outer periphery of the display area 200 but obliquely extracted from the display area 200. As a result, the TFT substrate 110 overlapping with the connection part of the conductive tape 133 and the anti-static transparent conductive layer 131 has transparency at the connection part and the notch 125n is formed at the light shield layer 125 of the color filter substrate 120, so that the light transmission part TR1 capable of light transmitting is formed. Also, since the signal extraction wiring is integrally formed with the earth extraction wiring 119b and the conductive light shield layer 117b configuring the earth pad 117 and is the earth connection path, it functions as a wiring. Also, the signal extraction wiring is arranged adjacent to or partially overlaps with the transparent conductive film 117a. Likewise, the signal extraction wiring is formed to bypass the connection part of the conductive tape 133 and the transparent conductive film 117a and the light transmission part TR2 capable of light transmitting is formed at the connection part of the conductive tape 133 and the transparent conductive film 117a. Meanwhile, in the first illustrative embodiment, since the TFT substrate 110 overlapping with the connection part is configured by the glass substrate 111 that is the transparent substrate, the insulation film 115 or the transparent insulation film of a single layer or stacked film of a plurality of transparent insulation films formed between the pixel electrodes 112 and the opposing electrodes 113, except for the light shield layer, it has transparency. However, if a part of the insulation film configuring the TFT substrate 10 includes a non-transparent insulation film, the non-transparent insulation film may be formed with an opening and the like at a part overlapping with the connection part, so that the TFT substrate 110 overlapping with the connection part has transparency and the light transmission part TR1 or TR2 capable of light transmitting is secured.

In FIG. 3, the end face of the polarization plate 132b arranged on the surface of the color filter substrate 120 is shown with the dotted line. However, as can be easily seen from the sectional view of FIG. 2, the conductive tape 133 is stuck to overlap with only the exposed part of the anti-static transparent conductive layer 131, which is not covered by the polarization plate 132b, so as not to extend over the polarization plate 132b. When the anti-static transparent conductive layer 131 and the conductive tape 133 can be securely stuck, the conduction can be made. Accordingly, the configuration in which the conductive tape 133 is stuck so that it also extends over the polarization plate 132b is not problematic. However, from a standpoint of making the liquid crystal display apparatus thinner, it is preferable to stick the conductive tape 133 so that it extends over only the anti-static transparent conductive layer 131 without extending over the polarization plate 132b. Also, from the standpoint of making the liquid crystal display apparatus thinner, it is preferable that the thickness of the conductive tape 133 is thinner, including the case where the conductive tape also extends over the polarization plate 132b. However, when the conductive tape does not extend over the polarization plate 132b, like this illustrative embodiment, it is preferable that the thickness of the conductive tape is equal to or thinner than the thickness of the polarization plate 132b. Also, in the first illustrative embodiment, the width of the exposed part of the anti-static transparent conductive layer 131, which is not covered by the polarization plate 132b, or the distance from the outline end face of the color filter substrate 120 to the end portion of the polarization plate 132b is set to be 1.0 mm. From the standpoints of realizing the slimmed frame and securing both the stability and the reliability of the connection of the conductive tape 133 when the conductive tape 133 is stuck so as to extend over only the anti-static transparent conductive layer 131 without extending over the polarization plate 132b, like the first illustrative embodiment, the width of the exposed part of the anti-static transparent conductive layer 131 which is not covered by the polarization plate 132b, or the distance from the outline end face of the color filter substrate 120 to the end portion of the polarization plate 132b is preferably set to be within a range of 0.3 mm or larger and 1.5 mm or smaller.

Meanwhile, in the first illustrative embodiment, the end face of the polarization plate 132a that is arranged on the surface of the TFT substrate 110 is made to coincide with the end face of the polarization plate 132b that is arranged on the surface of the color filter substrate 120. Accordingly, the polarization plate 132a does not extend over the connection part of the anti-static transparent conductive layer 131 and the conductive tape 133, i.e., the light transmission part TR1 capable of light transmitting and formed at the connection part. This is preferable because it is possible to easily observe the connection part even after the polarization plate 132a is stuck. In the meantime, different from the first illustrative embodiment, when the polarization plate 132a is configured to extend over the connection part, it may be preferable to perform a process of sticking the polarization plate 132a after sticking the conductive tape 133 and a process of observing or examining the connection part before sticking the polarization plate 132a. Also, the seal material 13 formed between the TFT substrate 110 and the color filter substrate 120 is preferably formed not to extend over the connection part of the anti-static transparent conductive layer 131 and the conductive tape 133, i.e., the light transmission part TR1 capable of light transmitting and formed at the connection part, as shown in FIGS. 1 and 2. The seal material 130 is basically made of the transparent material. Thus, even when the seal material is formed to extend over the light transmission part TR1, it is possible to observe the connection part of the anti-static transparent conductive layer 131 and the conductive tape 133. However, non-uniformity of luminance is apt to occur in the seal material 130, compared to the transparent substrate or transparent film, and the seal material may be an obstacle to the observation of the connection part of the anti-static transparent conductive layer 131 and the conductive tape 133. Therefore, the seal material 130 is formed not to extend over the light transmission part TR1, so that it is possible to easily observe the connection part.

The liquid crystal panel 100 of the first illustrative embodiment is configured as described above. The liquid crystal panel 100 further includes a backlight unit (not shown) being a light source, which is provided on an opposite side to the display surface formed in the display area 200 of the color filter substrate 120, which is opposed to the substrate surface of the TFT substrate 110, which is arranged via an optical sheet (not shown) having a function of regulating light emitted from the backlight unit, and which is accommodated together with the above members in a housing (not shown) having an opening at a part corresponding to the display surface of the display area 200, so that the liquid crystal display apparatus of the first illustrative embodiment is configured. Also, the liquid crystal display apparatus may further include a sensor unit of a thin plate type touch panel mechanism facing the display area 200 inside or outside the housing so as to provide a touch panel function of detecting a position on the display surface at which a contact object touches the display surface. Meanwhile, if a sensor unit having a touch panel mechanism is provided, the anti-static transparent conductive layer 131 of the first illustrative embodiment is arranged between the sensor unit and a part at which the signal wirings in the liquid crystal panel 100 are arranged and shields a signal electric field generated from the liquid crystal panel 100 for the sensor unit. Accordingly, the detection sensitivity of the sensor unit of the touch panel mechanism is improved.

The liquid crystal display apparatus of the first illustrative embodiment operates as follows. For example, the control signals are input from the control substrates 135, the driving IC chips 134 is operated, and then the signals are transmitted to the pixel areas via the wirings in the display area 200. As a result, a predetermined driving voltage that generates an electric field parallel with the substrate surface of the TFT substrate 110 or color filter substrate 120 (more specifically, since a parallel electric field and a substantially parallel electric field are together mixed in the FFS type, it can be said that the parallel component is a main electric field) is applied between the pixel electrodes 112 and the common electrodes 113 arranged in the respective pixel areas, so that the directions of the liquid crystal molecules are changed in response to the driving voltage. Then, the light emitted from the backlight unit is transmitted or blocked toward an observer via the TFT substrate 110, the liquid crystal layer 140 and the color filter substrate 120, so that an image and the like is displayed on the display surface formed on the display area 200 of the color filter substrate 120 of the liquid crystal panel 100.

In the first illustrative embodiment, the signal terminals 118a are provided at the two end sides of the TFT substrate 110 and the control substrates 135 are respectively connected to the signal terminals. However, for a small-sized liquid crystal display apparatus, the signal terminal 118a may be provided at only one end side and only one control substrate 135 may be connected thereto. Also, in the first illustrative embodiment, regarding the seal material 130, a liquid crystal injection port for injecting the liquid crystals is not shown. With respect to the liquid crystal injection method, when a vacuum injection method of injecting liquid crystals under vacuum is used, it is preferable to arrange the liquid crystal injection port at an end side other than the end sides at which the signal terminals 118a are arranged and to form a seal material for sealing the liquid crystal injection port. In addition, when a dropping injection method of arranging the liquid crystals formed into a liquid droplet shape and then sticking the substrates under vacuum is used, the liquid crystal injection port and the seal material may be omitted, like the first illustrative embodiment.

Figure 4:
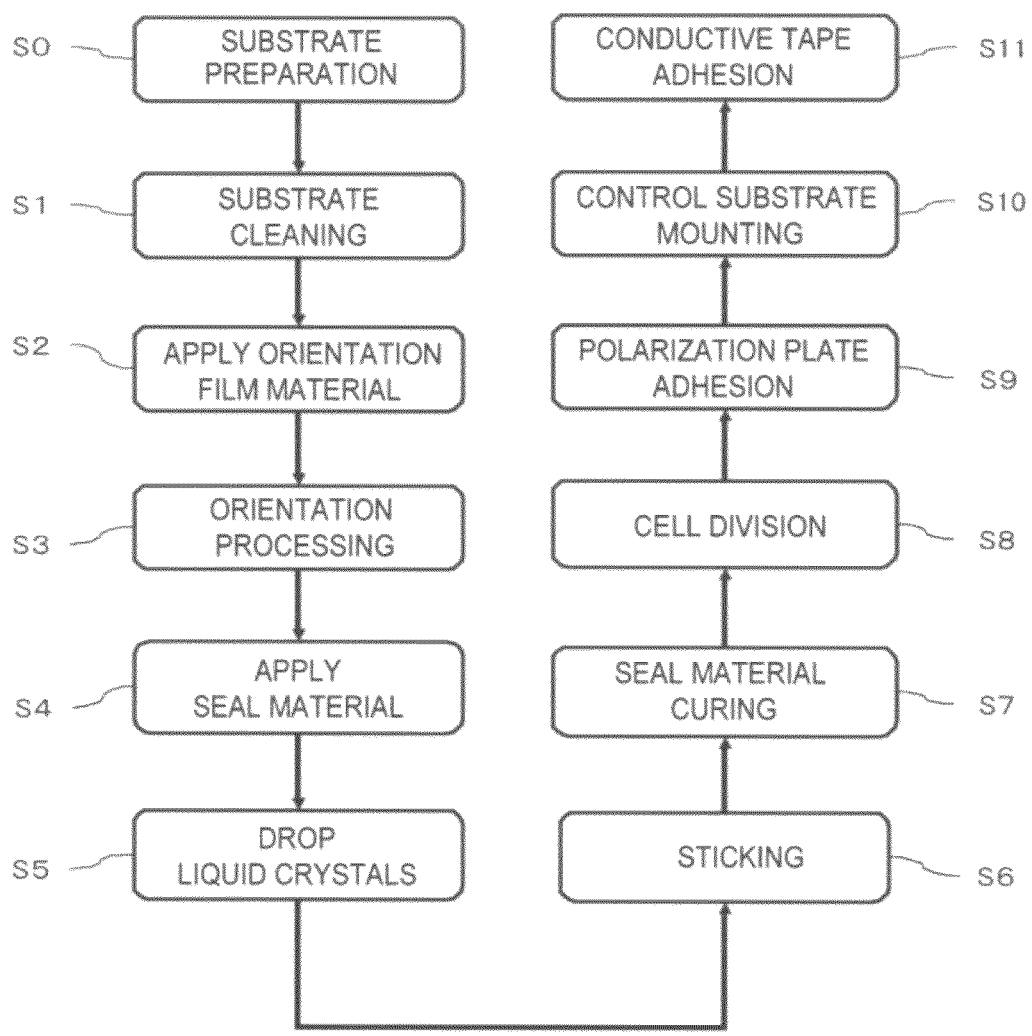
FIG. 4 is a flowchart illustrating a liquid crystal panel manufacturing process in a manufacturing method of the liquid crystal display apparatus of the first illustrative embodiment of this disclosure.

In the below, a method of manufacturing the liquid crystal display apparatus of the first illustrative embodiment is described. Here, the manufacturing process of the characteristic liquid crystal panel of this disclosure is sequentially described with reference to a flowchart shown in FIG. 4. Specifically, the important processes and important members are described with reference to FIGS. 5 to 9.

Figure 5:
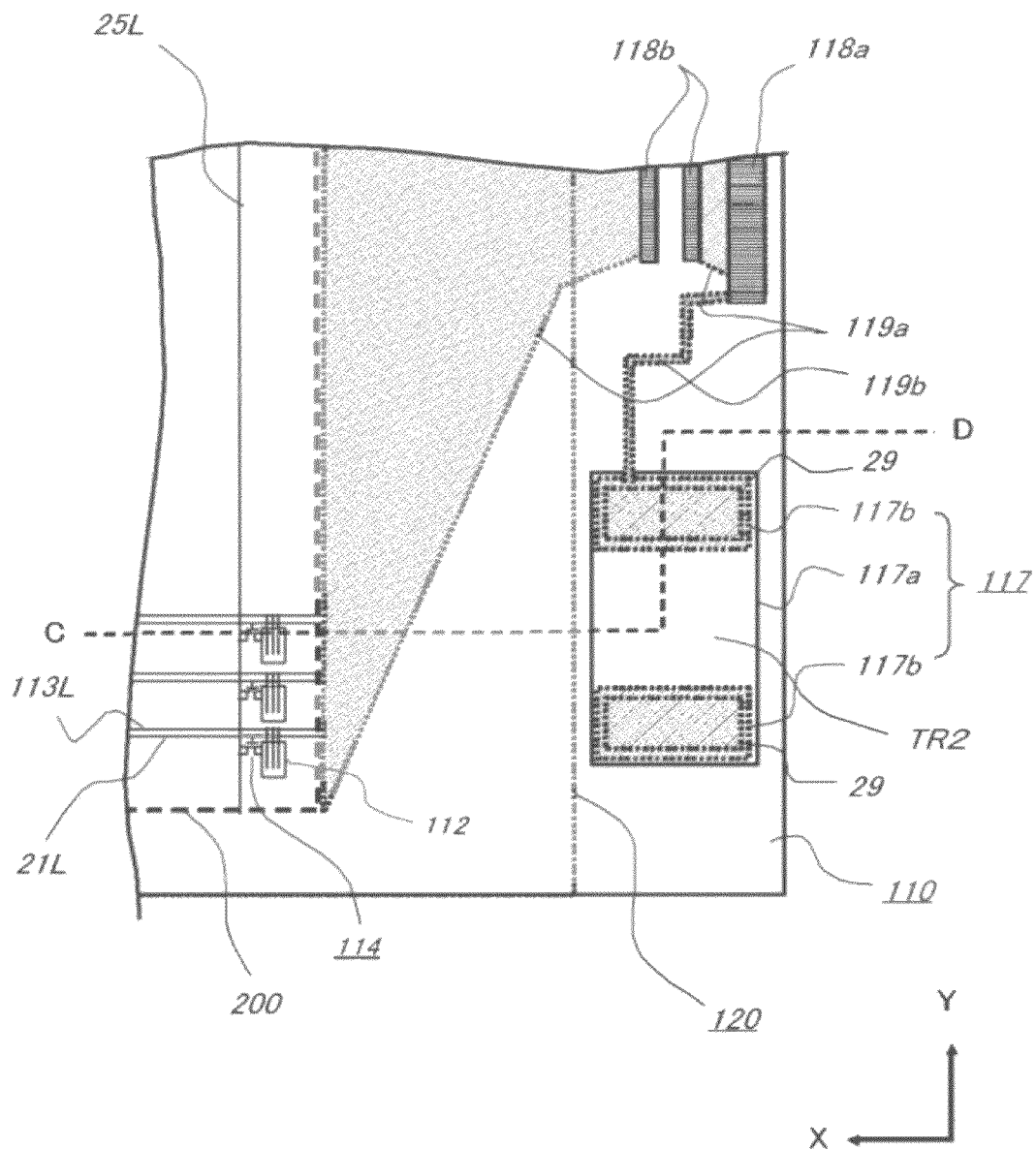
FIG. 5 is a plan view illustrating an earth pad adjacency of a mother TFT substrate in the liquid crystal panel manufacturing process of the first illustrative embodiment of this disclosure.
Figure 6:
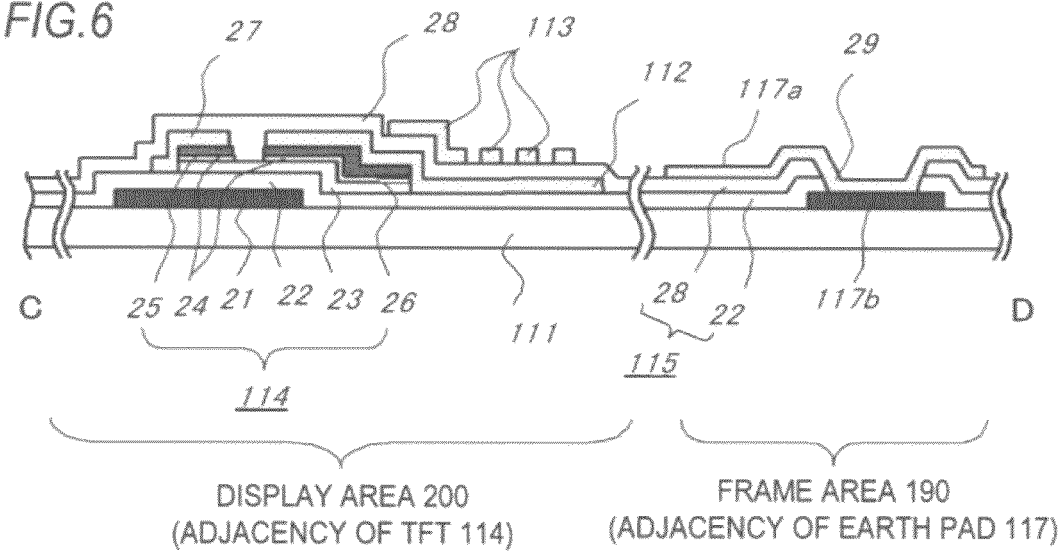
FIG. 6 is a sectional view illustrating the mother TFT substrate in the liquid crystal panel manufacturing process of the first illustrative embodiment of this disclosure.

First, in a substrate preparing process, a mother TFT substrate, from which the TFT substrate 110 is taken, and a mother color filter substrate being a mother substrate, from which the color filter substrate 120 is taken, before the adhesion are prepared, as shown in FIG. 5 (S0). In the descriptions, since a predetermined number of the TFT substrates 110 or color filter substrates 120 having the same configuration is arranged and formed on each mother substrate. Accordingly, one TFT substrate 110 or one color filter substrate 120 is representatively described. FIGS. 5 and 6 show configurations of an adjacency of the TFT 114 of the display area 200 and an adjacency of the earth pad 117 of the frame area 190, regarding the one TFT substrate 110 formed on the TFT mother substrate. FIG. 6 is a sectional view taken along a line C-D of FIG. 5. At a point of time when the TFT substrate 110 has been formed, the connection of the FFC 136 and the driving IC chip 134 to the signal terminals 118a, 118b or the connection of the conductive tape 133 to the earth pad 117 has not been implemented yet. First, although the descriptions of the parts already described in the overall configuration description with reference to FIGS. 1 to 3 are omitted, the layer configurations of the TFT 114 and the earth pad 117, which have not been described in the overall configuration description, are additionally described in detail.

First, the layer configuration of the TFT 114 is described. The TFT 114 has a gate electrode 21 on the glass substrate 111, which electrode is connected to the gate wiring 21L. Also, the plurality of common wirings 113L is formed on the substrate 1 by the same layer as the gate wiring 21L. The gate electrode 21, the gate wiring 21L and the common wiring 113L are formed of a conductive film made of a high melting point metal such as Cr, Al, Ta, Ti, Mo, W, Ni, Cu, Au, Ag and the like, a low resistance metal or alloy film having the same as main components, or the stacked film thereof. In the meantime, the conductive film is also functioned as the light shield layer.

A gate insulation film 22 is formed to cover the gate electrode 21, the gate wiring 21L and the common wiring 113L. Further, a semiconductor layer 23 is formed on the gate insulation film 22. The semiconductor layer 23 has a part overlapping with the gate electrode 21, which functions as an active area configuring the TFT 114 and is made of amorphous silicon, polycrystalline silicon and the like. Further, an ohmic contact film 24 having conductive impurities doped therein is formed in a shape of a pair of separated patterns on the semiconductor layer 23. The ohmic contact film 24 is made of a n-type amorphous silicon or n-type polycrystalline silicon having impurities such as phosphor (P) doped in a high concentration. A source electrode 25 and a drain electrode 26 are respectively formed on the ohmic contact film 24 having the shape of a pair of separated patterns. A source wiring 25L is formed by a pattern continuing to the source electrode 25. The source electrode 25, the drain electrode 26 and the source wiring 25L are metal patterns, which are formed of a conductive film made of a high melting point metal such as Cr, Al, Ta, Ti, Mo, W, Ni, Cu, Au, Ag and the like, a low resistance metal or alloy film having the same as main components, or the stacked film thereof, and are configured at the same layer by the same material. Like this, a channel etch-type TFT 114 is configured.

Also, the pixel electrode 112 made of a transparent conductive film such as ITO is formed on the drain electrode 26 with being electrically connected to the drain electrode 26. When seen from a plan view, the pixel electrode 112 extends from an area in which the drain electrode 26 is formed, to be formed over the substantially overall pixel area except for the TFT 114 formation area, and configures an electrode made of a transparent conductive film pattern of a flat plate shape. In the first illustrative embodiment, likewise the drain electrode 26, a transparent conductive film pattern 27 made of the common member to the pixel electrode 112 is formed on the source electrode 25 and the source wiring 25L. This is advantageous to make in common the patterning process of the pixel electrode 112 (and transparent conductive film pattern 27) and the patterning process of separating and forming the ohmic contact film 24 of the channel edge-type TFT 114, and the transparent conductive film pattern 27 is not necessarily required. Further, the opposite electrode 113 made of a transparent conductive film such as ITO is provided above the pixel electrode 112 with sandwiching an interlayer insulation film 28 therebetween. The interlayer insulation film 28 is formed by an insulation film such as silicon nitride and silicon oxide, an applied insulation film or a stacked film thereof. Also, the opposite electrode 113 is provided to oppose to the pixel electrode 112 with sandwiching the interlayer insulation film 28 therebetween, and slits for generating a fringe electric field are provided between the opposite electrode and the pixel electrode 112. A plurality of pectinate electrodes is formed between the slits in substantially parallel with each other. It can be said that the opposite electrode 113 is configured by the pectinate electrode. By the above configuration of the pixel electrodes 112 and the opposite electrodes 113, the fringe electric field is generated to drive the liquid crystals, so that the liquid crystal display apparatus of the FFS mode is configured.

Subsequently, the configuration of the earth pad 117 arranged in the frame area 190 will be described in detail. Although it is omitted in the description of the configuration with reference to FIG. 3, the transparent conductive film 117a and the conductive light shield layer 117b configuring the earth pad 117 are connected via a contact hole 29 that penetrates the insulation film 115 made of the gate insulation film 22 and the interlayer insulation film 28, as can be seen from the sectional view of FIG. 6 or plan view of FIG. 5. Also, in the first illustrative embodiment, as can be clearly seen from the sectional view of FIG. 6 showing that the transparent conductive film 117a configuring the earth pad 117 is provided on the interlayer insulation film 28, the transparent conductive film 117a is configured at the same layer as the opposing electrode 113 by the same material and is formed at the same time by the same patterning process. Additionally, regarding the earth pad 117, the interlayer insulation film 28 may be opened to configure the transparent conductive film 117a configuring the earth pad 117 by the same material as the pixel electrode 112 below the interlayer insulation film 28. Also, in the first illustrative embodiment, the conductive light shield layer 117b is configured at the same layer as the gate electrode 21, the gate wiring 21L and the common wiring 113L by the same material and is formed at the same time by the same patterning process. In the meantime, the conductive light shield layer may be configured at the same layer as the source electrode 25, the drain electrode 26 and the source wiring 25L by the same material and may be formed at the same time by the same pattering process because it is a light shield layer and may be formed without adding a separate process. Furthermore, although an additional process is required, a separate light shield layer may be formed and used in the same planar pattern shape as the conductive light shield layer 117b without forming the same simultaneously with the above elements. Also, in the first illustrative embodiment, as described above, the earth pad is earth-connected via the signal terminal 118a by using the earth extraction wiring 119b made of the integral pattern that is configured by the same metal material as the conductive light shield layer 117b. As a result, compared to the connection structure by the transparent conductive film, it is possible to connect the earth pad 117 and the signal terminal 118a with low resistance. That is, the conductive light shield layer 117b configuring the earth pad 117 serves as a wiring capable of realizing the earth connection of low resistance in addition to a role of easily positioning the conductive tape.

With respect to the manufacturing method of preparing the mother TFT substrate, the detailed configuration of the TFT substrate 110 being one unit of the mother TFT substrate has been described. However, if the detailed configuration of the TFT substrate 110 is known, the mother TFT substrate having the configuration of the TFT substrate 110 may be manufactured by appropriately combining the known method of manufacturing the TFT substrate of the FFS type liquid crystal display apparatus and the known film formation process and patterning process. Therefore, the specific description of the method of manufacturing the mother TFT substrate itself is omitted.

Figure 7:
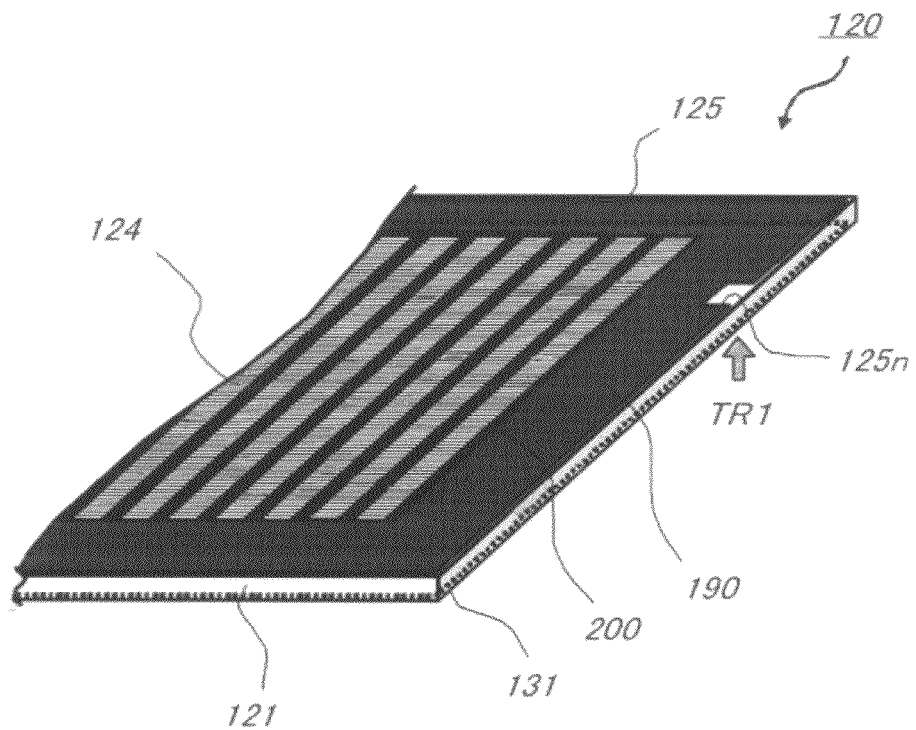
FIG. 7 is a sectional view illustrating a mother color filter substrate in the liquid crystal panel manufacturing process of the first illustrative embodiment of this disclosure.

Subsequently, in order to prepare the mother color filter substrate, the specific configuration of the color filter substrate 120 that is one unit of the mother color filter substrate is described with reference to FIG. 7. FIG. 7 illustrates an adjacency of the notch 125*n* provided to the light shield layer 125, at which the connection part of the anti-static transparent conductive layer 131 of the color filter substrate 120 configuring the mother color filter substrate and the conductive tape 133 is formed. FIG. 7 illustrates a state seen from a forming surface side of the light shield layer 125 of the color filter substrate 120, i.e., a side at which the liquid crystal layer 140 is provided when the liquid crystal panel 100 has been formed. In the meantime, the mother color filter substrate includes the other color filter substrates having the same configuration that are continuously arranged around the shown color filter substrate 120. However, the other color filter substrates are not shown so as to simplify the drawing.

Although the overlapping description with the description of the configuration with reference to FIG. 2 may be omitted, the color filter substrate 120 has the light shield layer 125 and the color filters 124 in the display area 200 on one surface of the glass substrate 121, as shown in FIG. 7. Also, the transparent conductive film such as ITO serving as the anti-static transparent conductive layer 131 is formed on the other surface (backside in FIG. 7) of the glass substrate 121. Also, the light shield layer 125 extends up to the end sides of the color filter substrate 120 and has the notch 125*n* having an opening at the end side of the color filter substrate 120. In the meantime, it is preferable that the light shield layer 125 is entirely covered up to the end sides of the color filter substrate 120, except for the notch 125*n*, because it suppresses the light leakage. However, the light shield layer may be formed up to positions distant from the end sides inasmuch as it can practically prevent the light leakage. For example, in order to suppress the light shield layer 125 from being peeled off at a time when cutting the outline of the color filter substrate 120, in the first illustrative embodiment, the light shield layer 125 is formed up to positions that are 0.2 mm distant from the end sides of the color filter substrate 120.

With respect to the method of forming the notch 125*n*, the known patterning method may be selected. For example, when the light shield layer 125 is made of a metal material such as chromium oxide, a method of forming a metal film and then performing a patterning by resist may be selected. When the light shield layer is made of a resin-based material having black particles dispersed in a resin, the patterning by the resist may be used, likewise the metal film, or a method of directly exposing and patterning the light shield layer 125 itself by using a photosensitive resin having black particles dispersed therein may be selected. Also, the notch may be formed simultaneously with a patterning of forming an opening of the light shield layer 125 to be arranged in the pixel area of the display area 200 and the notch 125*n* may be formed, without increasing the number of processes. Accordingly, the notch 125*n* formed at the light shield layer 125 has the light transmission part TR1 capable of light transmitting through the color filter substrate 120, as shown in FIG. 7. In addition, regarding the process of forming the color filters 124 or forming the anti-static transparent conductive layer 131 on the glass substrate 121, the known color material layer or transparent conductive film such as ITO may be used, and the known film formation process and patterning process may be appropriately combined to prepare the mother color filter substrate having the configuration of the color filter substrate 120. Therefore, the description of the specific method of manufacturing the mother color filter substrate itself is omitted.

Subsequently, a substrate cleaning process is performed for the mother TFT substrate having the TFT substrate 110, which is prepared as described above (S1). Then, in an orientation film material applying process, an orientation film material is applied to one surface of the mother TFT substrate (S2). In this process, an orientation film material made of an organic film is applied by a printing method and then baked and dried by a hot plate and the like. After that, a rubbing process is performed for the orientation film material, and a surface of the orientation film material is performed by an orientation process, so that an orientation film is formed on the TFT substrate 110 (S3). Also, like S1 to S3, the cleaning, the applying of the orientation film material and the rubbing are also performed for the mother color filter substrate having the color filter substrate 120 formed thereto, so that an orientation film is formed on the color filter substrate 120.

Subsequently, in a seal material applying process, a seal material is applied, as printing paste, on one surface of the mother TFT substrate or mother color filter substrate by a screen printing apparatus, so that the seal material 130 is formed in a pattern surrounding the display area 200 (S4). Then, in a liquid crystal dropping process, a plurality of liquid crystals having a liquid droplet shape is dropped in an area surrounded by the seal material 130 on one surface of the mother TFT substrate or mother color filter substrate (S5). Specifically, for example, a plurality of liquid crystals having a liquid droplet shape is dropped in an area surrounded by the seal material 130 on the color filter substrate 120 of the mother color filter substrate so that a predetermined amount of the liquid crystal layer 140 is formed. The liquid crystal layer is formed as described above because the dropping injection method of filling the liquid crystals and forming the liquid crystal layer 140 is used. However, when the vacuum injection method is used, the seal material 130 is formed to have a partially opened liquid crystal injection port, rather than to have a completely closed shape. Also, since the liquid crystals are injected through the liquid crystal injection port after sticking the substrates, the process of forming the liquid crystals having a liquid droplet shape is omitted.

Subsequently, in a sticking process, the mother TFT substrate and the mother color filter substrate are stuck to form a cell substrate (S6). Specifically, the mother TFT substrate and the mother color filter substrate are made to come close to each other with the liquid crystals having a liquid droplet shape put thereon and then overlap with each other through the positioning. As a result, the liquid crystals having a liquid droplet shape are sandwiched and uniformly spread between the mother TFT substrate and the mother color filter substrate, so that the integrated liquid crystal layer 140 is formed, which is filled in a volume surrounded by the respective seal materials 130 between the mother TFT substrate and the mother color filter substrate. Additionally, in a seal curing process, the seal material 130 is completely cured with the mother TFT substrate and the mother color filter substrate being stuck to each other (S7). This process is performed by applying the heat or illuminating the ultraviolet in accordance with the property of the seal material 130. In the first illustrative embodiment, the seal material is cured by illuminating the ultraviolet, which is well compatible with the dropping injection method. Accordingly, the mother TFT substrate and the mother color filter substrate are positioned and fixed. Also, when it is intended to make the substrate thinner so as to reduce the weight of the liquid crystal panel, it is preferable to perform thinning processing by chemical liquids or mechanical polishing. Then, in a cell dividing process, the cell substrate is divided into a plurality of individual cells (S8). In case that the vacuum injection method is used, the liquid crystal injection port is formed by partially opening the seal material 130 and then the liquid crystals are injected to the individual cells through the liquid crystal injection port, in a liquid crystal injecting process that is performed after the cell dividing process. In this process, the liquid crystals are filled through the liquid crystal injection port by the vacuum injection, so that the liquid crystal layer 140 is formed. Further, in a sealing process, the liquid crystal injection port is sealed. This process is performed by performing the sealing process by a photo-curable type resin and then illuminating the light thereto.

Figure 8A:
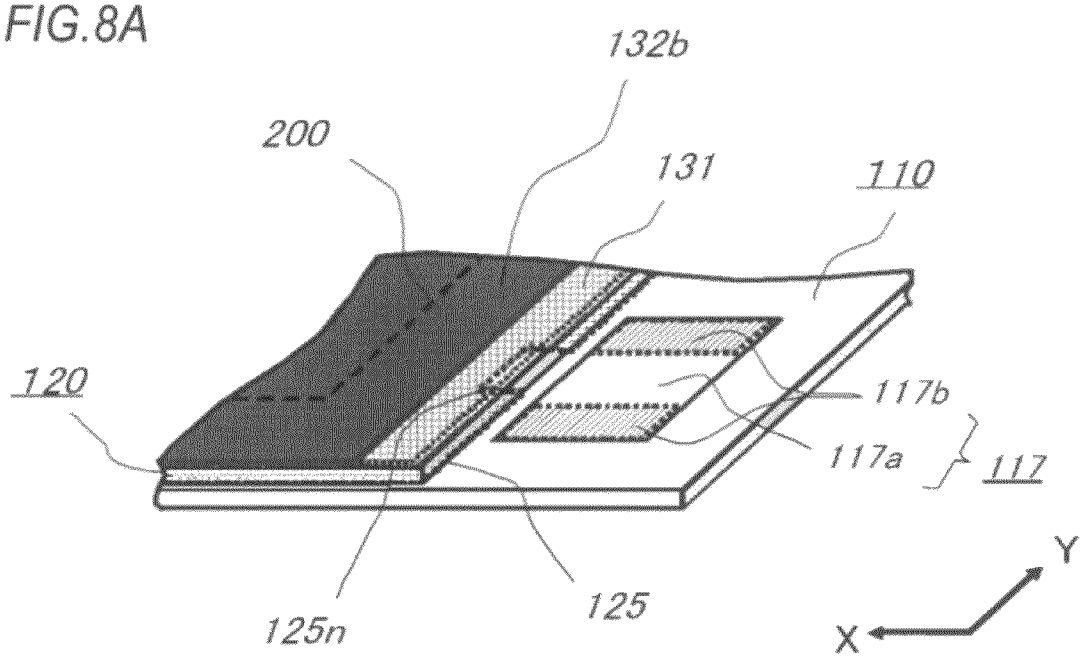
FIGS. 8A and 8B illustrate a conductive tape sticking process in the liquid crystal panel manufacturing process of the first illustrative embodiment of this disclosure.
Figure 8B:
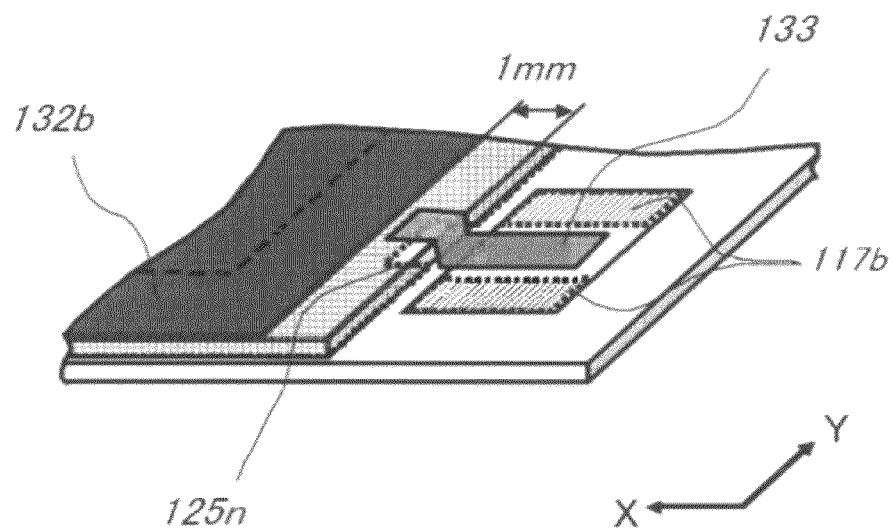

After dividing the cell substrate into the individual liquid crystal panel shapes, in a polarization plate sticking process, the polarization plate 132a and the polarization plate 132b are respectively stuck on the respective surfaces of the TFT substrate 110 and color filter substrate 120 of the cell (S9). Subsequently, in a control substrate mounting process, the control substrates 135 are mounted (S10). Then, in a conductive tape sticking process, the conductive tape 133 is stuck from the upper part of the color filter substrate 120 to the upper part of the TFT substrate 110 (S11). More specifically, FIGS. 8A and 5B illustrate an adjacency of an adhesion part of the conductive tape 133 of the individual cell having the liquid crystal panel shape. As shown in FIG. 8A, the exposed part on the anti-static transparent conductive layer 131, which is not covered by the polarization plate 132b on the color filter substrate 120, has the notch 125n that is formed at the light shield layer 125, and the earth pad 117 part of the TFT substrate 110 has a pair of conductive light shield layers 117b. When sticking the conductive tape 133, it is preferable to stick the conductive tape, while considering the notch 125n part and the pair of conductive light shield layers 117b as the positioning basis. More specifically, as shown in FIG. 8B, it is preferable to position and stick the conductive tape 133 at a position interposing between the opposing end faces of the notch 125n part and at a position interposing between the opposing end faces of the inner sides of the conductive light shield layers 117b. Further, regarding the sticking angle, it is preferable to stick the conductive tape 133 while considering an angle thereof so that the end faces of the conductive tape 133 in the longitudinal direction are parallel with at least one of the opposing end faces of the notch 125n part or at least one of the opposing end faces of the inner sides of the conductive light shield layers 117b. Meanwhile, in the first illustrative embodiment, the opposing end faces of the inner sides of the conductive light shield layers 117b or the opposing end faces of the notch 125n part are arranged so that the end faces of the conductive light shield layers 117b or end faces of the notch 125n part are arranged at the outer side of the conductive tape 133, and the conductive tape 133 is interposed between both sides. Therefore, when positioning the conductive tape 133, at least one of the opposing end faces of the inner sides of the conductive light shield layers 117b or at least one of the opposing end faces of the notch 125n part can be seen without veiling due to the conductive tape 133 and may be thus enabled to continuously function as the positioning basis. As a result, it is possible to perform the positioning more easily, so that it is possible to correctly perform the sticking process even though the sticking time of the conductive tape 133 is short. Also, regarding the positioning in the X direction, it is preferable to stick the conductive tape 133 so that the conductive tape is not put on the polarization plate 132a, on the basis of the end face of the polarization plate 132a, and it is efficient to form a thinner liquid crystal display apparatus. More specifically, the conductive tape 133 is fitted to a surface unevenness, which is formed depending on whether or not the polarization plate 132a, specifically to the end face of the polarization plate 132a, and is attached to follow the unevenness by using as a guide for positioning the conductive tape in the X direction. Alternatively, with considering an end face of the notch 125n parallel with the end face of substrate, the conductive tape 133 may be positioned and stuck so that the conductive tape is arranged at a more inner side than the end face of the notch 125.

As described above, it is possible to appropriately perform the positioning in the X direction, the positioning in the Y direction and the angle regulation to be parallel with the X direction. Like the first illustrative embodiment, it is possible to correctly perform the positioning easily and with less deviation in the narrow area such as the exposed part (the width thereof is about 1 mm) of the anti-static transparent conductive layer 131, which is not covered by the polarization plate 132a on the color filter substrate 120. As a result, it is possible to secure the stable connection structure between the conductive tape 133 and the anti-static transparent conductive layer 131 or earth pad 117, to perform the precise sticking process even with the short sticking time because the positioning is easily performed and to improve the productivity because the tack time of the conductive tape sticking process S11 is shortened. Also, when the conductive tape 133 is sufficiently stuck to the anti-static transparent conductive layer 131 or earth pad 117 by the conductive adhesive, the electrical connection may be secured. Therefore, it is possible to achieve the electrical connection even with the relatively short sticking time simply by appropriately pressing the conductive tape 133 adjacent to the respective adhesion parts. In the meantime, it is not necessarily required to execute the processes of S9 to S11 in order of S9, S10 and S11. That is, the sequence thereof may be appropriately changed.

By the above process, the liquid crystal panel 100 of the first illustrative embodiment is completed. Further, the backside of the TFT substrate 110, which is an opposite side to the visible side of the liquid crystal panel 100, is mounted with a backlight unit with sandwiching an optical film such as phase difference plate, between. Then, the liquid crystal panel and the surrounding members thereof are appropriately accommodated in a frame made of resin, metal and the like, so that the liquid crystal display apparatus of the first illustrative embodiment is completed.

Figure 9A:
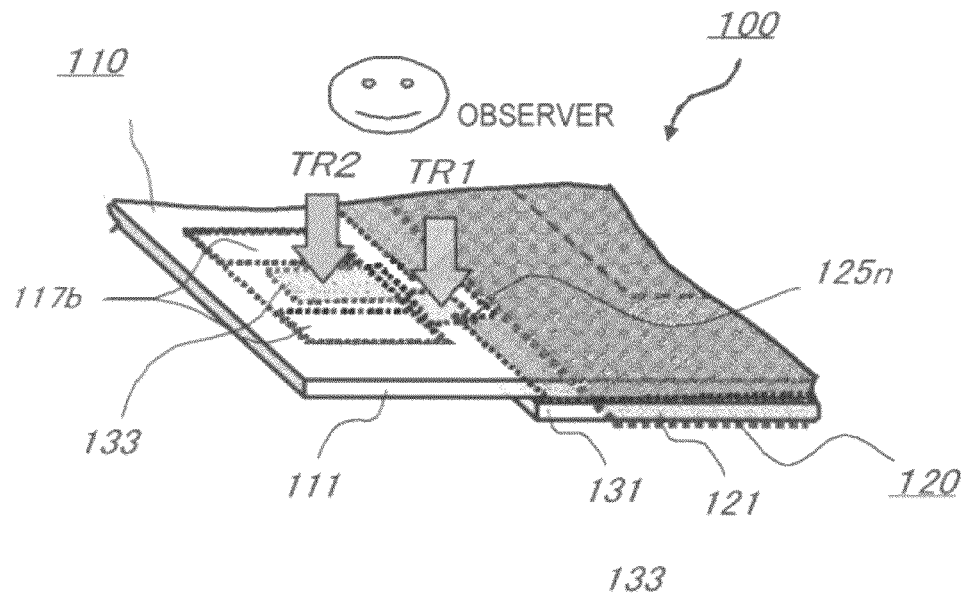
FIGS. 9A and 9B illustrates an inspection process of an adhesion state of a conductive tape in the liquid crystal panel manufacturing process of the first illustrative embodiment of this disclosure.

Also, in the manufacturing process of the liquid crystal panel 100 of the first illustrative embodiment, it is preferable to perform an observation inspection process of the adhesion state of the conductive tape 133 after the conductive tape sticking process of S11. The inspection process of the adhesion state of the conductive tape 133 is described with reference to FIGS. 9A and 9B. FIG. 9A shows a state in which the conductive tape sticking process of S11 is completed regarding the liquid crystal panel 100 of the first illustrative embodiment, which is seen from the TFT substrate 110. In the liquid crystal panel 100 of the first illustrative embodiment, as shown in FIG. 9A, the light transmission part TR1 or light transmission part TR2 capable of light transmitting is formed at the connection part of the anti-static transparent conductive layer 131 and the conductive tape 133 or the connection part of the earth pad 117 and the conductive tape 133. In FIG. 9A, an observer's position is shown when the observation check process by a person is added. However, it is preferable to perform the observation from an opposite side to the side to which the conductive tape 133, which is the light shield member, is stuck, i.e., from the TFT substrate 110 of the liquid crystal panel 100. From the observer's position of the TFT substrate 110 side to the connection part of the anti-static transparent conductive layer 131 and the conductive tape 133 or the connection part of the earth pad 117 and the conductive tape 133, both the glass substrate 111 configuring the TFT substrate 110 and the glass substrate 121 configuring the color filter substrate 120 made of the transparent substrates capable of light transmitting and the other configurations are also made to enable light transmission. In other words, by the above configuration, the light transmission part TR1 or light transmission part TR2 capable of light transmitting is formed at the connection part of the anti-static transparent conductive layer 131 and the conductive tape 133 or the connection part of the earth pad 117 and the conductive tape 133. Therefore, from the observer's position to the connection part of the anti-static transparent conductive layer 131 and the conductive tape 133 or the connection part of the earth pad 117 and the conductive tape 133, there is no configuration that shields the light, and it is possible to optically observe and check the state of the connection part. Also, the inspection process may be performed with naked eyes by a person (observer), may be performed by appropriately using a simple magnifier, an optical microscope and the like or may be automated by appropriately combining an optical evaluation apparatus, an optical microscope and image processing apparatus. When an optical apparatus, a device and the like is used, not the observer, it is preferable to arrange an acquisition part, which acquires optical information thereof, at the observer's position in FIG. 9A, i.e., at the TFT substrate 110 side of the liquid crystal panel 100. Also, the observation inspection process may be performed after the tape sticking process of S11 for all the liquid crystal panels 100 or for samples every predetermined number of the liquid crystal panels. Also, in the observation inspection process, the light and the like is illuminated to the liquid crystal panel 100 from an opposite side to the observer's position, so that it is possible to easily know whether the conductive tape 133 is stuck (or whether the adhesion of the conductive tape is deviated) by checking whether the light is leaked from the notch 125n formed at the light shield layer 125, which may be preferably added as an evaluation item.

Figure 9B:
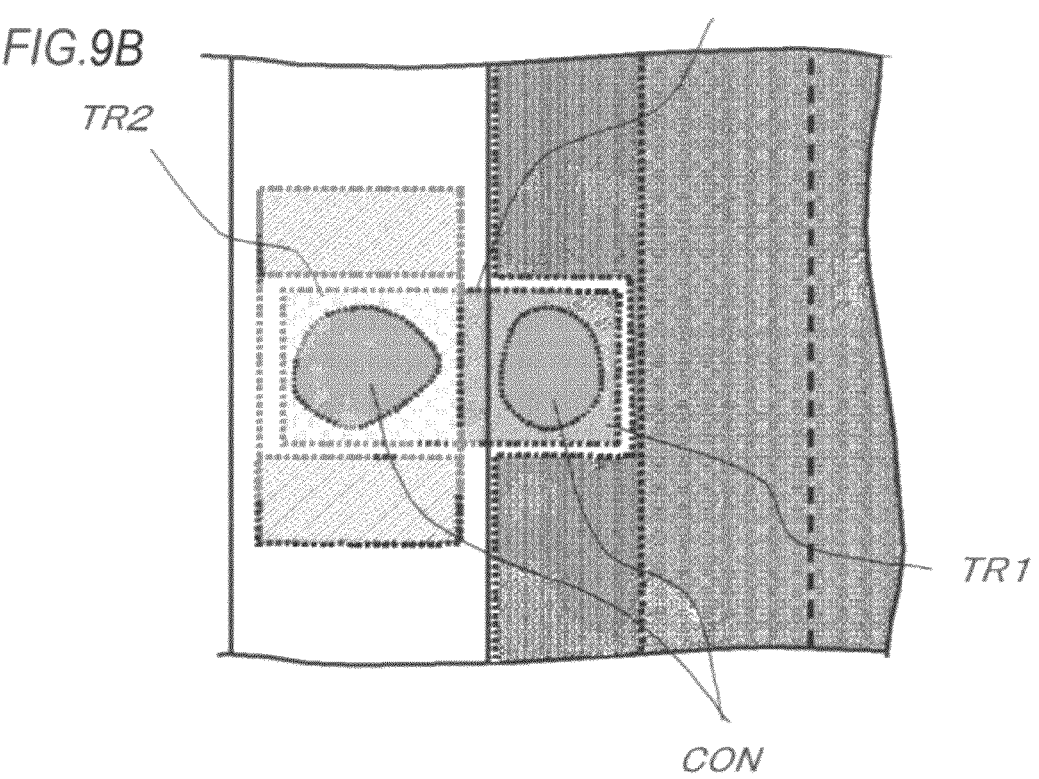

Subsequently, the specific evaluation points about the connection state of the connection part of the anti-static transparent conductive layer 131 and the conductive tape 133 or the connection part of the earth pad 117 and the conductive tape 133 are described with reference to FIG. 9B. FIG. 9B is a plan view showing an adjacency of the connection part of the anti-static transparent conductive layer 131 and the conductive tape 133 or an adjacency of the connection part of the earth pad 117 and the conductive tape 133, which is seen from the observer or the TFT substrate 110 side of the liquid crystal panel 100. At a part of the conductive tape 133 in which the conductive adhesive is appropriately stuck to the anti-static transparent conductive layer 131 or the transparent conductive film 117a of the earth pad 117, an adhesion part CON accompanying change of color or brightness in the transparent conductive film formation part is represented. Specifically, the adhesion part CON is seen darker, compared to a non-adhesion part, and is observed with non-uniform brightness because an adhesion part, in which an adhesion layer is stuck to the transparent conductive film, and a non-adhesion part, in which the adhesion layer is not stuck to the transparent conductive film, is mixed at the micro level. Accordingly, it is possible to easily determine the part in which the adhesion part CON is formed. Meanwhile, in case that the optical inspection is automated, it may be possible to automatically extract an area of the adhesion part CON by performing image processing such as binarization for image data of the transparent conductive film formation part, which is extracted by the optical microscope. Specifically, in an appropriate evaluation reference for securing the stability including the reliability of the connection between the transparent conductive film and the conductive tape, a value of an area of the adhesion part CON or a value of an occupancy to an overlapping area of the transparent conductive film and the conductive tape may be used as a reference value. More specifically, although it may be different depending on a degree of tolerance design of the overlapping area of the transparent conductive film and the conductive tape with respect to the resistance value, an overlapping area of the transparent conductive film and the conductive tape may be designed to be twice times than a resistance value, which is required for the earth connection, and then the required occupancy in the evaluation may be 50% or more of the reference. Also, when it is determined by the evaluation that the connection state has defect, an appropriate recovery process for the defect of the connection state such as re-performance of the conductive tape sticking process of S11 and additional compression of the conductive tape 133 may be added, and then the observation inspection process of the adhesion state of the conductive tape 133 may be again performed. That is, a process flow of circulating the observation inspection process and the recovery process may be appropriately adopted.

As described above, according to the liquid crystal display apparatus of the first illustrative embodiment, the anti-static transparent conductive layer 131 provided on the surface of the color filter substrate 120 of the horizontal electric field type liquid crystal panel is connected to the earth pad 117 to be earth-connected, which is provided on the TFT substrate 110, by the conductive tape 133 that is stuck from the color filter substrate 120 to the TFT substrate 110. Further, adjacent to the conductive tape 133 or at the partially overlapping light shield layer (light shield layer 125 or conductive light shield layer 117b), the connection part of the conductive tape 133 and the anti-static transparent conductive layer 131 or earth pad 117 includes the light transmission part TR1 or light transmission part TR2 which are capable of penetrating the light at the connection part of the conductive tape 133 and the transparent conductive film 117a or the earth pad 117. Thereby, the boundary of the light transmission part TR1 or light transmission part TR2 and the light shield layer (light shield layer 125 or conductive light shield layer 117b) may be used as the basis at the time of sticking the conductive tape 133. Further, since the target at the time of sticking the conductive tape 133 is represented, it is possible to easily perform the positioning and to thus improve the productivity due to the reduction of the takt time of the conductive tape sticking process. Additionally, the effect of improving the productivity due to the reduction of the takt time may be also achieved by the merit in that it is not necessary to add the strong sticking process such as compression process and by using the connection structure of the conductive tape 133 that archives the electrical connection by the simple processing of pressing the conductive tape at the time of adhesion. Furthermore, after sticking the conductive tape 133, it is possible to perform the optical observation/inspection and the like through the light transmission part TR1 or light transmission part TR2 that is formed so that the color filter substrate 120 and the TFT substrate 110 at the connection part of the conductive tape 133 and the anti-static transparent conductive layer 131 or earth pad 117, i.e. overlapping with the connection portion, have transparency. As a result, the stable connection structure is achieved in the conduction between the conductive layers such as electrodes formed on the respective transparent substrates. Also, the anti-static transparent conductive layer 131, which is provided on the surface of the color filter substrate 120 of the horizontal electric field type liquid crystal panel, is earth-connected via the conductive tape 133 and the earth pad 117 by the connection structure. Thereby, it is possible to stably discharge the charges due to the static electricity, which is generated on the surface of the color filter substrate 120, to the outside of the liquid crystal panel by the stable conduction structure. As a result, it is possible to achieve the reliable horizontal electric field type liquid crystal display apparatus having no display defects caused due to the charge-up.

Further, according to the liquid crystal display apparatus of the first illustrative embodiment, when seen from a plan view, the outline end face (boundary of the light shield layer and the light transmission part TR1 or light transmission part TR2) of the light shield layer (light shield layer 125 or conductive light shield layer 117b) is formed along the outline end face of the conductive tape 133. Thereby, it is possible to perform the positioning in higher precision or to easily perform the positioning, so that the productivity is improved. Also, by the connection part of the conductive tape 133 and the anti-static transparent conductive layer 131 or the earth pad 117, the wiring (signal extraction wiring 119a, earth extraction wiring 119b or conductive light shield layer 117b), which is the light shield layer arranged adjacent to or partially overlapping with the conductive tape 133, is arranged to bypass the connection part of the conductive tape 133 and the transparent conductive film 117a or the earth pad 117, and the light transmission part TR1 or light transmission part TR2 capable of light transmitting is formed. By this configuration, it is possible to effectively use the frame area 190 and to achieve the high reliability effect by forming the light transmission part TR1 or light transmission part TR2, with achieving the effect of further slimming the frame. Furthermore, since the polarization plate 132b is arranged up to the adjacency of the substrate end of the color filter substrate 120 and the conductive tape 133 is stuck to cover only the anti-static transparent conductive layer 131 without covering the polarization plate 132b, it is possible to achieve the effects of the slimmed frame and the high reliability at the same time. Additionally, the light shield layer 125 of the color filter substrate 120 is arranged to extend up to the substrate end, so that the effect of shielding the light or slimming the frame is achieved. Further, the light shield layer 125 has the notch shape (notch 125n) having an opening at the substrate end side, so that the light transmission part TR1 is formed. By this configuration, it is possible to achieve the above effects without increasing the number of manufacturing processes. Also, it is possible to easily know whether the conductive tape 133 made of the light shield member is stuck (or whether the adhesion of the conductive tape is deviated) by checking whether the light is leaked from the notch 125n formed at the light shield layer 125. As a result, it is possible to easily find the non-adhesion due to the operation missing at the time of adhesion of the conductive tape 133 and the adhesion abnormality such as oblique adhesion of the conductive tape 133 to the notch 125n by the inspection after the sticking process of the conductive tape 133. Also, since the liquid crystal panel is the FFS type liquid crystal panel in which the pixel electrode 112 and the opposite electrode 113 are made of the transparent conductive films, it is possible to form the transparent conductive film 117a configuring the earth pad 117 simultaneously with the pixel electrode 112 or opposite electrode 113 by selecting the common material to one of the pixel electrode 112 and the opposite electrode 113, as the material of the transparent conductive film 117a. Therefore, in the FFS type liquid crystal panel, the earth pad 117 is configured by the transparent conductive film 117a and the conductive light shield layers 117b, as described above, so that it is possible to form the light transmission part TR2 at the connection part of the earth pad 117 and the conductive tape 133 at low cost or easily without adding a separate process.

Additionally, in the first illustrative embodiment, in order to form the light transmission part TR1 or light transmission part TR2 capable of light transmitting at the connection part of the anti-static transparent conductive layer 131 and the conductive tape 133 or the connection part of the earth pad 117 and the conductive tape 133 on the TFT substrate 110, the wiring area configuration of the taper shape is adopted for the signal extraction wirings 119a and the earth extraction wiring 119b or the conductive light shield layers 117b configuring the earth pad 117 are arranged at both sides of the conductive tape 133. Thereby, the signal extraction wirings 119a and the earth extraction wiring 119b and the conductive light shield layers 117b are formed to bypass the connection part of the conductive tape 133 and the transparent conductive film 117a or anti-static transparent conductive layer 131. It has only to secure the light transmission part TR1 or light transmission part TR2 capable of light transmitting. Therefore, when it is necessary to arrange the wiring pattern with overlapping with the connection part of the anti-static transparent conductive layer 131 and the conductive tape 133, a wiring pattern having line and space of a wide pitch, a wiring pattern of mesh structure (such as a reticulation structure, a lattice structure and the like) or a wiring pattern made of a transparent conductive film may be adopted and may be arranged to overlap while securing a light transmission part at the connection part. In these wiring patterns, the wiring has an opening or transparent part capable of light transmitting. Therefore, even when the wiring pattern is arranged to overlap with the connection part of the anti-static transparent conductive layer 131 and the conductive tape 133, the TFT substrate 110 overlapping with the connection part has transparency, so that it is possible to secure the light transmission part TR1 capable of light transmitting.

Also, in the first illustrative embodiment, as the configuration of the earth pad 117 at the connection part of the conductive tape 133 and the transparent conductive film 117a, the conductive light shield layers 117b configuring the earth pad 117 are arranged to be adjacent to the conductive tape 133 without overlapping with the conductive tape, when seen from a plan view. However, a configuration in which the conductive tape 133 is stuck to be adjacent to or to partially overlap with the conductive light shield layer 117b that is the light shield layer and the conductive tape 133 is stuck to the part at which only at least the transparent conductive film 117a of the earth pad 117 is arranged, the light transmission part TR2 is arranged at the connection part of the conductive tape 133 and the transparent conductive film 117a configuring the earth pad 117. Accordingly, it is possible to easily observe the connection part through the light transmission part TR2. Also, the boundary between the conductive light shield layer 117b and the light transmission part TR2 becomes the positioning basis at the time of adhesion of the conductive tape 133. As a result, the same effects as the first illustrative embodiment are achieved. Likewise, in the first illustrative embodiment, regarding the configuration of the connection part of the conductive tape 133 and the anti-static transparent conductive layer 131 provided on the surface of the color filter substrate 120, the outline end face of the notch 125n, i.e., the boundary of the light shield layer 125 and the light transmission part TR1 is formed along the outline end face of the conductive tape 133 and the conductive tape 133 is arranged only at the inner side of the end face of the notch 125n without overlapping with the light shield layer 125, when seen from a plan view. However, if the conductive tape 133 is stuck adjacent to or with partially overlapping with the light shield layer 125, specifically stuck to the notch 125n having an opening at the end side, which is formed at the light shield layer 125, the light transmission part TR1 is arranged at the connection part of the anti-static transparent conductive layer 131 and the conductive tape 133. Therefore, it is possible to easily observe the connection part through the light transmission part TR1. Also, the boundary between the light shield layer 125 and the light transmission part TR1 becomes the positioning basis at the time of adhesion of the conductive tape 133. As a result, the same effects as the first illustrative embodiment are achieved.

As described above, it is possible to achieve the same effects as the first illustrative embodiment even in the configuration in which the conductive tape 133 is stuck with partially overlapping with the light shield layer (conductive light shield layer 117b or light shield layer 125) as well as the configuration of the first illustrative embodiment in which the conductive tape 133 is arranged adjacent to the conductive light shield layers 117b configuring the earth pad 117 on the TFT substrate 110 or the light shield layer 125 provided on the color filter substrate 120 without overlapping with the same, when seen from a plan view. A specific example of the configuration in which the conductive tape is stuck with partially overlapping with the conductive light shield layer 117b or light shield layer 125, i.e., a modified embodiment of the first illustrative embodiment is described with reference to FIG. 10. In the modified embodiment of the first illustrative embodiment, a conductive tape 133a stuck over the anti-static transparent conductive layer 131 and the earth pad 117 is stuck with entirely covering the conductive light shield layers 117b configuring the earth pad 117. Additionally, the conductive tape 133a is stuck with entirely covering the light transmission part TR1 without a gap, which is formed by a notch 125n2 provided to the light shield layer 125 of the color filter substrate 120, and is also stuck with partially overlapping with the light shield layer 125. Also, the positional relation of the outlines of the conductive tape 133a and the notch 125n2 is opposite to the first illustrative embodiment. However, the notch 125n2 provided to the light shield layer 125 is also formed to have the outline end face (boundary of the light shield layer 125 and the light transmission part TR1) of the light shield layer 125 that is formed along the two opposing end faces of the outline of the conductive tape 133a, which are parallel with each other in the X direction, with being adjacent to the two opposing end faces, like the first illustrative embodiment. Also, although the conductive light shield layers 117b configuring the earth pad 117 are also changed into the boundary of the light shield layer and the transmission part at the outer side of the earth pad 117, the outline end face (boundary of the light shield layer and the transmission part) of the conductive light shield layer 117b is arranged along the outline end face of the conductive tape 133a with being adjacent to the outline end face, like the first illustrative embodiment. More specifically, the conductive tape 133a of this modified embodiment has a square shape of 5×5 mm, and regarding the width 5 mm (width in the Y direction) of the conductive tape 133a, the notch 125n2 having a pair of end faces, which are distant from each other by the similar distance (for example, 4.5 mm), is formed.

Figure 10:
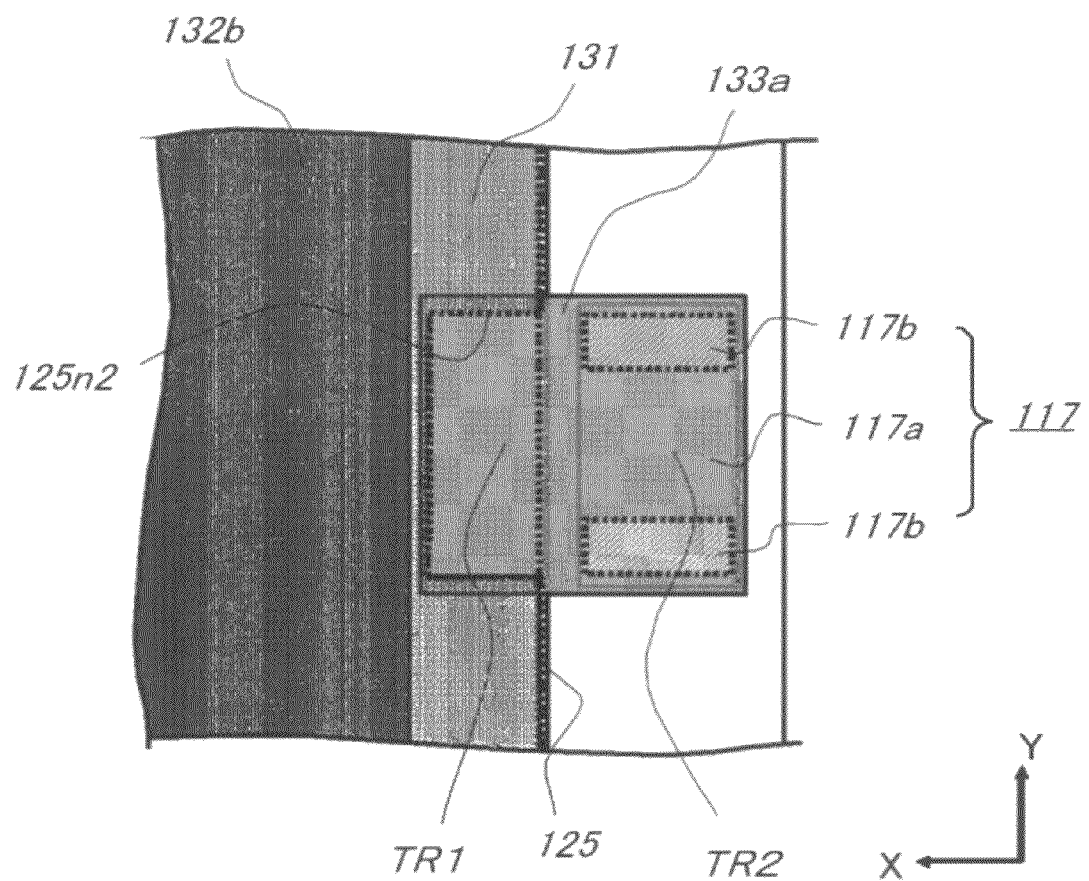
FIG. 10 is a plan view illustrating an adjacency of a conductive tape connection part in a modified embodiment of the first illustrative embodiment of this disclosure.

The configuration shown in FIG. 10 is different from the first illustrative embodiment, in that the pair of opposing end faces of the notch 125n2 provided to the light shield layer 125 is arranged at the inner sides of the outline end faces of the conductive tape 133a. However, the opposing end faces of the notch 125n2 are arranged along the two opposing end faces of the conductive tape 133a, which are parallel with each other in the longitudinal direction, with being substantially parallel with and adjacent to the two opposing end faces. Accordingly, like the first illustrative embodiment, it is possible to position the conductive tape in the Y direction, on the basis of the boundary of the light shield layer 125 of the notch 125n2 and the light transmission part TR1. Also, although the end faces of the conductive light shield layers 117b are arranged at the inner sides of the outline end faces of the conductive tape 133a, which is different from the first illustrative embodiment, the conductive light shield layers 117b are arranged along the two opposing end faces of the conductive tape 133a, which are parallel with each other in the longitudinal direction, with being substantially parallel with and adjacent to the two opposing end faces. Accordingly, it is possible to position the conductive tape in the Y direction, on the basis of a reference that the conductive light shield layers 117b are arranged below the conductive tape 133a and do not come out of the conductive tape. Like this, according to the modified embodiment described with reference to FIG. 10, it is possible to achieve the same effects as the first illustrative embodiment. Also, in the notch 125n2 part provided to the light shield layer 125, the conductive tape 133a is stuck with partially overlapping with the light shield layer 125 and the light transmission part TR1, which is formed by the notch 125n2 and is capable of light transmitting, is covered by the conductive tape 133a without a gap. Accordingly, an effect of suppressing the light leakage at the notch 125n2 is also achieved, in addition to the effects of the first illustrative embodiment. In the meantime, an intermediate configuration of the configuration shown in FIG. 10 and the first illustrative embodiment, in which the outline end faces of the light shield layer (conductive light shield layers 117b or light shield layer 125) and the conductive tape completely coincide with each other (a distance therebetween is zero), when seen from a plan view, is also within a range of the same configuration as the first illustrative embodiment, and can realize the same effects. With respect to the effect of suppressing the light leakage, which is achieved by the configuration shown in FIG. 10, the similar effect may be achieved although the light may be leaked a little depending on the degree of adhesion precision of the conductive tape.

Also, in the first illustrative embodiment, the light transmission part TR1 and the light transmission part TR2 capable of light transmitting are respectively provided to the connection part of the conductive tape 133 and the anti-static transparent conductive layer 131 and the connection part of the conductive tape and the earth pad 117. However, the individual effects, which are achieved by providing the light transmission part TR1 and the light transmission part TR2, and the individual effects, which are achieved by the characteristic configurations adopted in the surrounding parts of the light transmission part TR1 and the light transmission part TR2, may be also achieved even when the light transmission part is individually formed. For example, when it is possible to sufficiently secure the width or area of the exposed part of the anti-static transparent conductive layer 131 and it is not possible to sufficiently secure an area of the overlapping area (connection part) of the earth pad 117 and the conductive tape 133 due to the limitation in the width of the projecting part 110p of the TFT substrate 110 projecting from the color filter substrate 120, the concern about the connection defect at the anti-static transparent conductive layer 131 and the conductive tape 133 is reduced, so that only the light transmission part TR1 may be omitted. Like this, even in the configuration in which only the light transmission part TR1 (or notch 125n provided to the light shield layer 125) is omitted from the first illustrative embodiment, it is possible to achieve the effects, which are secured by the light transmission part TR2 of the TFT substrate 110, the light shield layer of the surrounding thereof and wiring arrangement and the like in the first illustrative embodiment. To the contrary, when it is possible to sufficiently secure an area of the overlapping area (connection part) of the earth pad 117 and the conductive tape 133 and it is difficult to sufficiently secure an area of the overlapping area (connection part) of the conductive tape 133 and the anti-static transparent conductive layer 131 due to the narrow width of the exposed part of the anti-static transparent conductive layer 131, the concern about the connection defect between the earth pad 117 and the conductive tape 133 is reduced, so that only the light transmission part TR2 may be omitted. In the below, a specific example of the configuration in which the light transmission part TR2 is omitted from the configuration of the first illustrative embodiment and only the light transmission part TR1 is provided, i.e., a modified embodiment of the first illustrative embodiment is described with reference to FIGS. 11A and 11B.

First, FIG. 11A shows a modified embodiment in which the light transmission part TR2 is omitted from the first illustrative embodiment, specifically an adjacency of the modified earth pad 117. As shown, the earth pad 117 includes the transparent conductive film 117a that is arranged on the superficial layer, like the first illustrative embodiment, and a conductive light shield layer 117c that is provided below the transparent conductive film 117a with overlapping with the same. However, the conductive light shield layer 117c is not formed with the light transmission part TR2 capable of light transmitting. Even in the configuration, it is possible to check the connection state by using the light transmission part TR1 provided to the connection part of the conductive tape 133a and the anti-static transparent conductive layer 131 and to secure the reference at the time of adhesion of the conductive tape 133a. Furthermore, as shown, a pair of opposing end faces of the notch 125n2 is arranged to sandwich the conductive tape 133a from both sides along the two opposing end faces of the conductive tape 133a, which are parallel in the longitudinal direction of the outline of the conductive tape, with being substantially parallel with and adjacent to the two opposing end faces. More specifically, for example, the conductive tape 133a of this modified embodiment has a square shape of 5×5 mm, and regarding the width 5 mm (width in the Y direction) of the conductive tape 133a, the notch 125n2 having a pair of opposing end faces, which are distant from each other by the similar distance (for example, 4.5 mm), is formed. Accordingly, like the first illustrative embodiment, it is possible to position the conductive tape in the Y direction, on the basis of the outline end face (boundary of the light shield layer 125 and the light transmission part TR1) of the light shield layer 125 of the notch 125n2 part. Also, although the end face of the conductive light shield layer 117c is arranged at the inner side of the outline end face of the conductive tape 133a, which is different from the first illustrative embodiment, the conductive light shield layer 117c having a pair of opposing end faces, which are distant from each other by the similar distance (for example, 4.5 mm) as the width 5 mm (width in the Y direction) of the conductive tape 133a, is formed. Also, as can be seen from FIG. 11A, the end faces of the conductive light shield layer 117c are arranged along the two opposing end faces of the conductive tape 133a, which are parallel with each other in the longitudinal direction of the outline of the conductive tape, with being substantially parallel with and adjacent to the two opposing end faces. This characteristic is the same as the first illustrative embodiment. Accordingly, it is possible to position the conductive tape in the Y direction, on the basis of a reference that the conductive light shield layer 117c is arranged below the conductive tape 133a and do not come out of the conductive tape. Like this, according to the modified embodiment described with reference to FIG. 11A, it is possible to achieve the same effects as the first illustrative embodiment although it is not possible to check the connection state of the connection part of the earth pad 117 and the conductive tape 133a. Also, regarding the width 5 mm (width in the Y direction) of the conductive tape 133a, the width (width in the Y direction) of the conductive light shield layer 117c may be formed to be larger (for example, 6.0 mm) or to be the same (for example, 5.0 mm), without limiting to the configuration of FIG. 11A. Also in this case, when the end faces of the conductive light shield layer 117c are arranged along the two opposing end faces of the conductive tape 133a, which are parallel with each other in the longitudinal direction of the outline of the conductive tape, with being substantially parallel with and adjacent to the two opposing end faces, it is possible to position the conductive tape in the Y direction, on the basis of an amount that the conductive light shield layer 117c comes out of both sides of the conductive tape 133a (on the basis of a reference that the conductive light shield layer does not come out of both sides, when the widths are the same), and to achieve the same effects as the configuration of FIG. 11A.

Also, a configuration of another modified embodiment in which the light transmission part TR2 is omitted is shown in FIG. 11B. As shown, the notch 125n provided to the light shield layer 125 and configuring the light transmission part TR1 and the conductive light shield layer 117c configuring the earth pad 117 are smaller than the width of the conductive tape 133a (specifically, the conductive tape 133a has a square shape of 5×5 mm, and regarding the width 5 mm in the Y direction, a width of the notch 125n in the Y direction is set to be 3.0 mm). When the opposing end faces of the notch 125n or the end faces of the conductive light shield layer 117c are not approximate to the outline end faces of the conductive tape 133a, the positioning precision of the conductive tape 133a in the Y direction or X direction is lowered, compared to the first illustrative embodiment. Accordingly, in this modified embodiment, instead of the conductive light shield layer configuring the earth pad 117, a pair of conductive light shield layers 117d is separately provided which is arranged to sandwich the conductive tape 133a from both sides thereof along the two opposing end faces of the conductive tape 133a, which are parallel with each other in the longitudinal direction of the outline of the conductive tape, with being substantially parallel with and adjacent to the two opposing end faces. Furthermore, a conductive light shield layer 117e is provided which is arranged adjacent to a remaining end face of the outline end faces of the conductive tape 133a. By adding the configuration, when seen from a plan view, the outline end faces of the pair of conductive light shield layers 117d or conductive light shield layer 117e are formed along the outline end faces of the conductive tape 133a. Thereby, it is possible to achieve the positioning precision in the Y or X direction equivalent to the first illustrative embodiment.

In the meantime, one of the conductive light shield layers 117d and the conductive light shield layer 117e may be arranged depending on circumstances and it is possible to independently achieve the effect of improving the positioning precision in the Y or X direction, respectively. Also, like the conductive light shield layer 117b of the first illustrative embodiment, the conductive light shield layer 117c, the conductive light shield layers 117d and the conductive light shield layer 117e are formed of the same material as the gate electrode 21, the gate wiring 21L and the common wiring 113L, and it is easy and enables the low cost. However, they may be formed of the other materials. Also, in the configuration in which the light transmission part TR2 provided to the earth pad 117 is omitted, which is shown in FIGS. 11A and 11B, regarding the transparent conductive film 117a and conductive light shield layer 117c configuring the earth pad 117, the transparent conductive film 117a is not necessarily required. That is, the earth pad 117 may be configured only by the conductive light shield layer 117c and the transparent conductive film 117a may be omitted. To the contrary, when the conductive light shield layer 117c is not used as the positioning reference, as shown in FIG. 11B, the earth pad 117 may be configured only by the transparent conductive film 117a and the conductive light shield layer 117c may be omitted. When the conductive light shield layer 117c is omitted, the whole surface of the earth pad 117 is configured only by the transparent conductive film 117a. Thus, when the light transmission part TR2 is formed over the whole surface of the earth pad 117 and at the connection part of the conductive tape 133 and the transparent conductive film 117a, it is possible to achieve the effects achieved in the first illustrative embodiment.

Figure 12A:
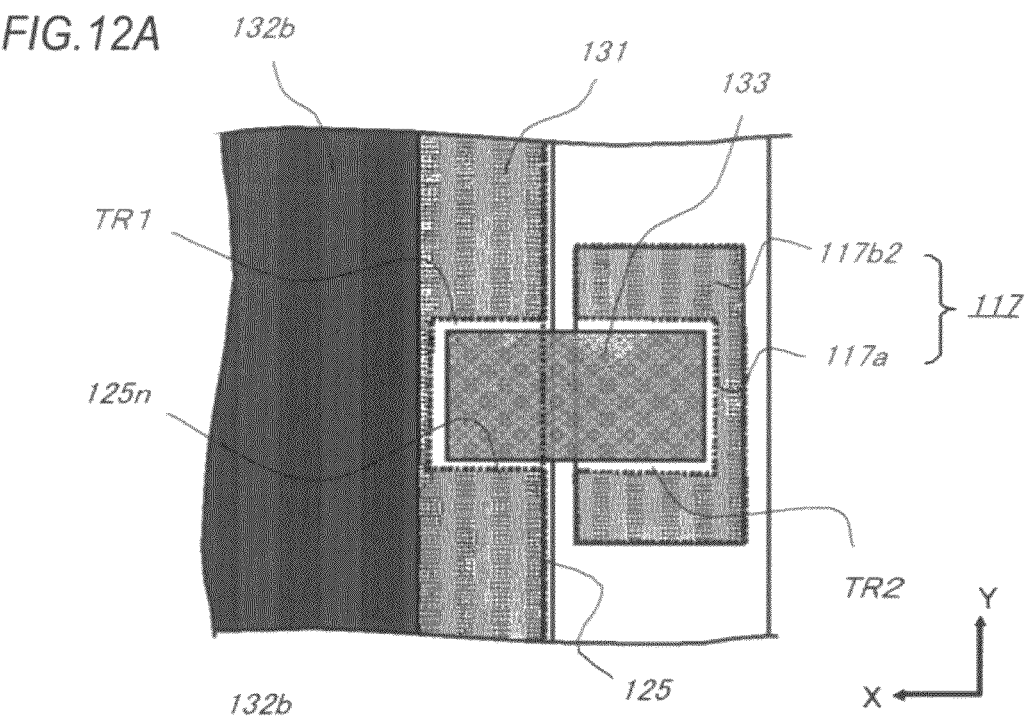
FIGS. 12A and 12B are plan views illustrating an adjacency of a conductive tape connection part in a modified embodiment of the first illustrative embodiment of this disclosure.

In the above, the modified embodiments in which the light transmission part TR2 capable of light transmitting is omitted from the earth pad 117 have been described. However, a variety of modifications can be also made within a range of the configuration having the light transmission part TR2. For example, the other modified embodiment in which the conductive light shield layer 117b configuring the earth pad 117 of the first illustrative embodiment is specifically modified is described with reference to FIGS. 12A and 12B. First, in one modified embodiment, the pair of conductive light shield layers 117b described with reference to FIG. 3, which are arranged to sandwich the conductive tape 133 from both sides, is modified into a conductive light shield layer 117b2 having a U shape with the light transmission part TR2 capable of light transmitting being arranged at the connection part of the conductive tape 133 and the transparent conductive film 117a. The configurations of the polarization plate 132b, the light shield film 125 and the like are the same as those of the first illustrative embodiment shown in FIG. 3. Also, the transparent conductive film 117a configuring the earth pad 117 is also formed to have a rectangular shape that entirely covers the conductive light shield layer 117b2, which is the same as the first illustrative embodiment. In the meantime, although the contact hole 29 is not shown in FIG. 12A, the contact hole 29 is formed by opening the insulation film 115 between the transparent conductive film 117a and the conductive light shield layer 117b2 and connects the transparent conductive film 117a and the conductive light shield layer 117b2, and the contact hole may be formed in an area of an inner side following the U-shaped outline of the conductive light shield layer 117b2. Alternatively, like the first illustrative embodiment, at least both ends of the earth pad 117 may be provided with a pair of contact holes 29. Likewise, although the earth extraction wiring 119b is not shown FIG. 12A, it is preferable that the earth extraction wiring 119b is connected to any one position of the outline end portions of the conductive light shield layer 117b2 because the conductive light shield layer 117b2 is configured by a continuous pattern. Also, the conductive light shield layer 117b2 may be regarded as a configuration in which a conductive light shield layer, which is arranged along a remaining side of the outline end faces of the conductive tape 133 facing the earth pad 117 with being substantially parallel with and adjacent to the remaining side, is added to the remaining side from the pair of conductive light shield layers 117b shown in FIG. 3, and the pair of conductive light shield layers 117b is connected to each other.

Also in the configuration having the U-shaped conductive light shield layer 117b2, like the conductive light shield layer 117b, the conductive light shield layer 117b2 is arranged with partially overlapping with the transparent conductive film 117a configuring the earth pad 117, and the light transmission part TR2 capable of light transmitting is arranged at the connection part of the conductive tape 133 and the transparent conductive film 117a. Thus, the same effects as the first illustrative embodiment are achieved. Specifically, in this modified embodiment, when the conductive light shield layer 117b2 is made of the same material as the gate electrode 21, the gate wiring 21L and the common wiring 113L, the conductive light shield layer 117b2 becomes a low resistance member having considerably low resistance, compared to the transparent conductive film 117a having relatively high resistance (when the transparent conductive film 117a has a thickness within a practical film thickness range). Thereby, the potential in the earth pad 117 is made to be uniform by the conductive light shield layer 117b2 that is the low resistance member arranged at the three sides of the surrounding of the transparent conductive film 117a configuring the earth pad 117. Thus, compared to the configuration of the first illustrative embodiment, it is possible to achieve an additional effect of stabilizing the connection resistance between the earth pad 117 and the conductive tape 133 at low. Also, the end face of the conductive light shield layer 117b2 is formed along the remaining side of the outline end faces of the conductive tape 133 facing the earth pad 117. Hence, it is possible to further achieve an effect of positioning the conductive tape in the X direction on the basis of the added end face of the conductive light shield layer 117b2, in addition to the positioning effect in the Y direction at the time of adhesion of the conductive tape 133 by the pair of the conductive light shield layers 117b of the first illustrative embodiment. Additionally, since the conductive light shield layer 117b2, which is arranged at the three sides of the surrounding of the transparent conductive film 117a, is integrally formed and configures the earth connection path, it functions as a wiring. Also, the conductive light shield layer 117b2 is arranged to be adjacent to or to partially overlap with the transparent conductive film 117a and is formed to bypass the connection part of the conductive tape 133 and the transparent conductive film 117a, it is possible to effectively use the frame area 190. As a result, it is possible to further improve the effect of slimming the frame and to achieve the high reliability effect resulting from the light transmission part TR2 at the same time.

Figure 12B:
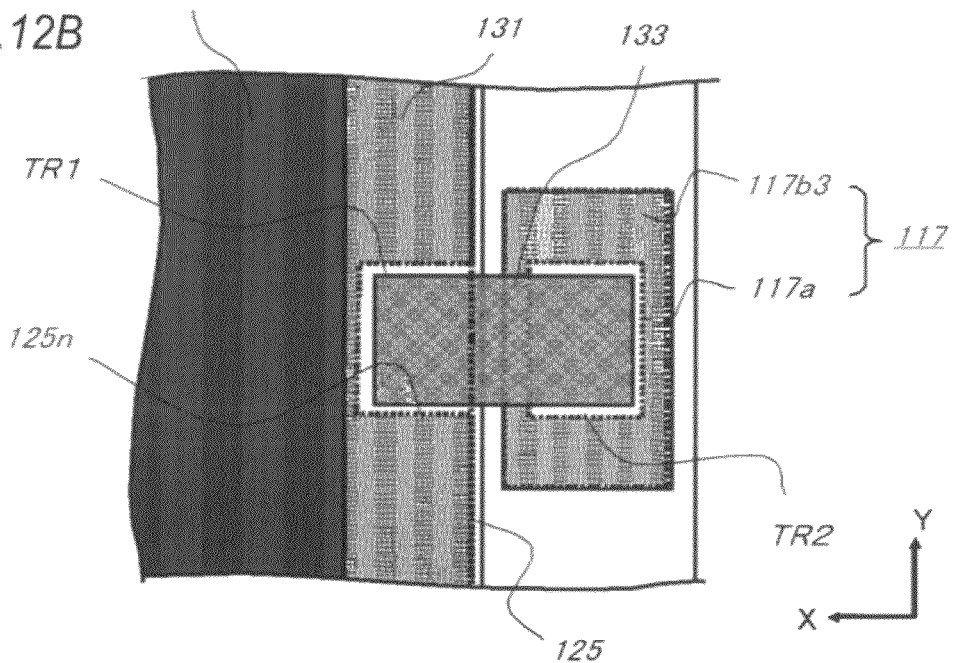

In a further modified embodiment, as shown in FIG. 12B, the conductive light shield layer may be changed into a conductive light shield layer 117b3 having a square hole shape with the light transmission part TR2 capable of light transmitting being arranged at the connection part of the conductive tape 133 and the transparent conductive film 117a. Also in the configuration having the conductive light shield layer 117b3, like the conductive light shield layer 117b of the first illustrative embodiment, the conductive light shield layer 117b3 is arranged with partially overlapping with the transparent conductive film 117a configuring the earth pad 117, and the light transmission part TR2 capable of light transmitting is arranged at the connection part of the conductive tape 133 and the transparent conductive film 117a. Thus, the same effects as the first illustrative embodiment are achieved. Also, as shown, the end faces of the inner side of the conductive light shield layer 117b3 having a square hole shape are arranged along the three sides of the outline end faces of the conductive tape 133 facing the earth pad 117 with being substantially parallel and adjacent to the three sides. Thereby, it is possible to achieve the same positioning effect as the configuration of FIG. 12A. In the meantime, regarding the effect of stabilizing the connection resistance between the earth pad 117 and the conductive tape 133 at low, the conductive light shield layer 117b3 having the lower resistance than the transparent conductive film 117a is arranged at four sides of the surrounding of the transparent conductive film 117a configuring the earth pad 117. Thus, the stabilizing effect is more improved, compared to the configuration of FIG. 12A. Also, although the conductive light shield layer 117b3 is arranged to partially overlap with the conductive tape 133, it is possible to form the light transmission part TR2 capable of light transmitting. This is the same configuration as the first illustrative embodiment. Thus, there is no difficulty in achieving the effects described in the first illustrative embodiment. Also, likewise the configuration of FIG. 12A, the conductive light shield layer 117b3 functioning as a wiring is formed to bypass the connection part of the conductive tape 133 and the transparent conductive film 117a. Hence, likewise the configuration of FIG. 12A, it is possible to further improve the effect of slimming the frame and to achieve the high reliability effect at the same time.

Figure 13A:
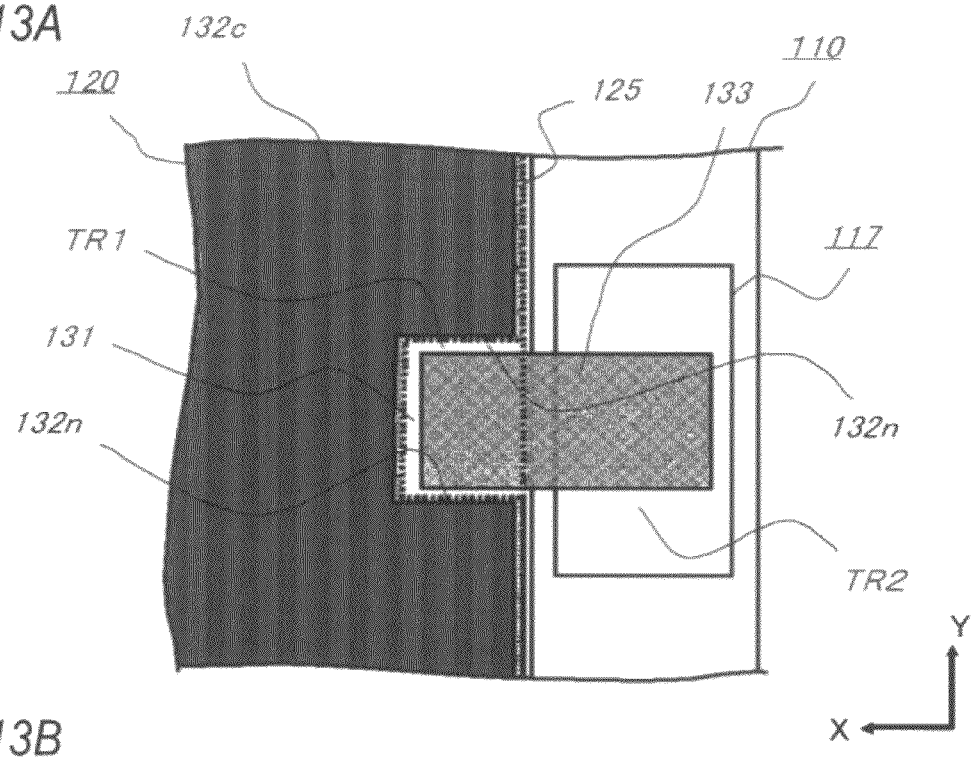
FIGS. 13A and 13B are plan views illustrating an adjacency of a conductive tape connection part in a modified embodiment of the first illustrative embodiment of this disclosure.
Figure 13B:
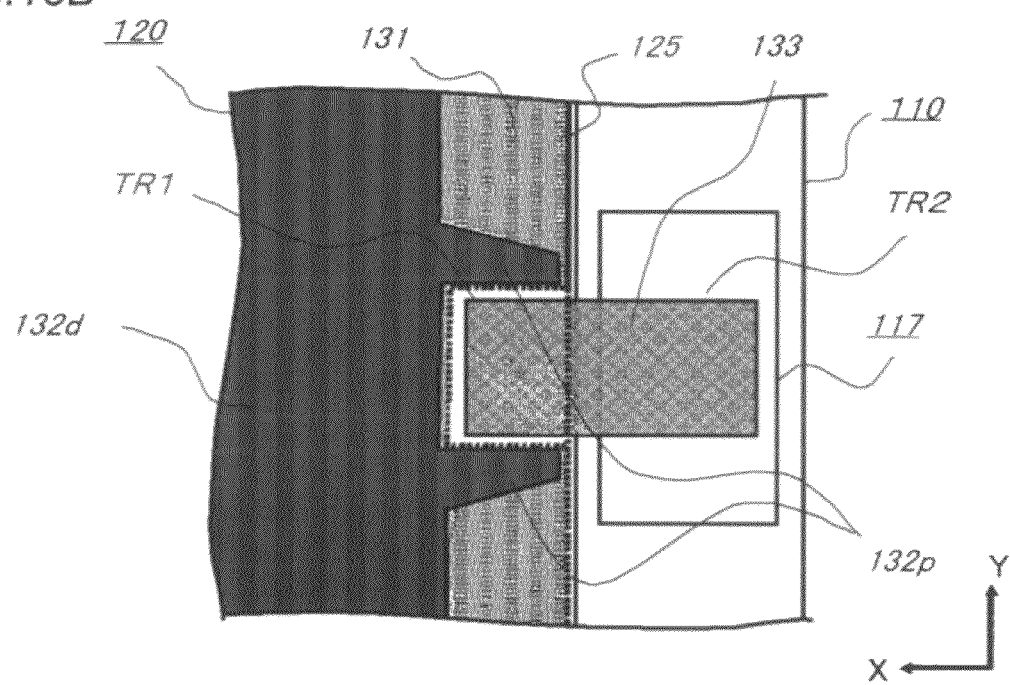

In the below, a modified embodiment about the polarization plate arranged on the color filter substrate 120, which is appropriate to a combination with the first illustrative embodiment or modified embodiment of the first illustrative embodiment, is described with reference to FIGS. 13A and 13B. In one modified embodiment, as shown in FIG. 13A, the polarization plate 132c arranged on the color filter substrate 120 is formed to extend up to a substrate end side of the color filter substrate 120, and a polarization plate notch 132n having an opening at the substrate end side of the color filter substrate 120 is formed. According to the color filter substrate 120 of this modified embodiment, likewise the first illustrative embodiment, the notch 125n is formed at the light shield layer 125 formed on the color filter substrate 120, and a shape of the polarization plate notch 132n formed at the polarization plate 132c substantially coincides with the notch 125n, when seen from a plan view. Also, the surface of the color filter substrate 120 has the anti-static transparent conductive layer 131, likewise the first illustrative embodiment. The polarization plate 132c is arranged to cover the anti-static transparent conductive layer 131 and an exposed part of the anti-static transparent conductive layer 131, which is not covered by the polarization plate 132c, is formed at the polarization plate notch 132n part. In the meantime, it is necessary for the polarization plate 132c to cover the anti-static transparent conductive layer 131 in at least the display area 200, likewise the polarization plate 132b of the first illustrative embodiment. Furthermore, likewise the first illustrative embodiment, the conductive tape 133 is provided which is stuck from the upper part of the anti-static transparent conductive layer 131 on the color filter substrate 120 to the earth pad 117 on the TFT substrate 110. However, the conductive tape 133 forms a connection part with the anti-static transparent conductive layer 131 at the exposed part that the anti-static transparent conductive layer 131 is not covered by the polarization plate 132c at the polarization plate notch 132n part. Furthermore, the end faces of the polarization plate 132c at the polarization plate notch 132n part are formed along the outline end faces of the conductive tape 133. More specifically, a pair of end faces of the polarization plate notch 132n is arranged to sandwich the conductive tape 133 from both sides along the two opposing end faces of the conductive tape 133, which are parallel with each other in the longitudinal direction of the conductive tape, with being substantially parallel with and adjacent to the two opposing end faces.

In the modified embodiment configured as described above and shown in FIG. 13A, compared to the polarization plate 132b having the rectangular shape of the first illustrative embodiment or modified embodiment thereof, the number of processing processes of forming the polarization plate notch 132n is increased, so that the manufacturing cost may be increased a little. However, the surface of the color filter substrate 120 has a surface unevenness, to which the conductive tape 133 is fitted, at the adhesion part of the conductive tape 133 by the polarization plate notch 132n. When sticking the conductive tape 133, the surface unevenness, to which the conductive tape 133 is fitted, functions as a guide that make the conductive tape 133 be stuck so that the conductive tape 133 is accommodated in a recess area of the polarization plate notch 132n, thereby forcibly positioning the conductive tape. Accordingly, it is possible to remarkably improve the positioning effect at the time of adhesion of the conductive tape 133. In another modified embodiment having the same effect, as shown in FIG. 13B, the polarization plate is changed into a polarization plate 132d having a pair of polarization plate protrusions 132p that is arranged to sandwich the conductive tape 133 from both sides. Also in this case, the end faces of the polarization plate 132d at the polarization plate protrusions 132p parts are formed along the outline end faces of the conductive tape 133. More specifically, a pair of opposing end faces at the inner sides of the polarization plate protrusions 132p is arranged along the two opposing end faces of the outline of the conductive tape 133, which are parallel with each other in the longitudinal direction, with being substantially parallel with and adjacent to the two opposing end faces. Therefore, when sticking the conductive tape 133, the same positioning effect as the polarization plate notch 132n of the polarization plate 132c is achieved. Meanwhile, in the modified embodiments of the polarization plate 132b described with reference to FIGS. 13A and 13B, the configuration of the earth pad 117 is not limited and is not shown. That is, because the modified embodiment can be combined with any of the earth pads 117 described in the first illustrative embodiment or modified embodiments of the first illustrative embodiment, the configuration is not limited. In other words, any of the earth pads 117 described in the first illustrative embodiment or modified embodiments of the first illustrative embodiment may be selected and it is possible to achieve a complex effect resulting from the respective combinations.

In the meantime, regarding the conductive light shield layers 117b, the conductive light shield layer 117b2, the conductive light shield layer 117b3, the conductive light shield layer 117c, the conductive light shield layers 117d and the conductive light shield layer 117e that are used in the liquid crystal display apparatus of the first illustrative embodiment or modified embodiments thereof, the conductivity is not required for the conductive light shield layers 117d and the conductive light shield layer 117e if the conductive light shield layers 117d and the conductive light shield layer 117e are not used as the wiring paths. Therefore, they may be formed by light shield layers having no conductivity. Also, the conductive light shield layers 117b, the conductive light shield layer 117b2, the conductive light shield layer 117b3 and the conductive light shield layer 117c are formed as the pattern continuing to the earth extraction wiring 119b and are connected to the transparent conductive film 117a, thereby configuring the earth pad 117 as the conduction path. Thereby, it is possible to make the potential in the earth pad 117 uniform, to stabilize the connection resistance at low and to suppress the increase of the processes. However, the conductivity is not necessarily required if they simply serves as the adhesion basis of the conductive tape 133, and they may be formed by light shield layers having no conductivity. That is, the conductive light shield layers 117b, the conductive light shield layer 117b2, the conductive light shield layer 117b3, the conductive light shield layer 117c, the conductive light shield layers 117d and the conductive light shield layer 117e may be changed into any light shield layers, and the effect of serving as the adhesion basis of the conductive tape 133 may be achieved, regardless of the changing. Also, regarding the light shield function of the light shield layers, if it is intended to achieve only the role functioning as the adhesion basis of the conductive tape 133, a light shield layer having a little transmittance may be also used. If the boundary of the glass substrate and the transparent conductive film 117a is to be seen as the adhesion basis, such configuration may be used. That is, the light shield layer may be used if it is not transparent like the glass substrate or transparent conductive film 117a, and a layer may have a predetermined film thickness, which enables the film to be recognized as a colored layer. (regarding the predetermined film thickness, in a case of an amorphous silicon film having lower light transmittance compared to a general transparent film, the thickness may be required at least 30 nm to be recognized as a colored layer).

Meanwhile, in the liquid crystal display apparatus of the first illustrative embodiment or modified embodiments thereof, the example in which this disclosure is applied to the FFS type liquid crystal display apparatus has been described because this disclosure realizes the optimal effects in the apparatus, in that the horizontal electric field type liquid crystal panel has the anti-static transparent conductive layer, which requires the earth connection, on the color filter substrate, the pixel electrode and the opposite electrode are made of the transparent conductive films and the transparent conductive film may be easily used for the earth pad. Regarding an example in which the same horizontal electric field type liquid crystal panel is used, also in the IPS type in which pectinate electrodes are used for a pair of electrodes, i.e., pixel and opposite electrodes formed so as to generate and to drive the electric field in a direction parallel with the color filter substrate, the arrangement of the anti-static transparent conductive layer on the color filter substrate and the earth connection are necessarily required. Therefore, the connection structure of the first illustrative embodiment or modified embodiments thereof in which the earth pad and the conductive tape are used effectively operates in the IPS type, and the same effects are achieved except for the effects that are uniquely achieved in the FFS type liquid crystal display apparatus. Also, likewise the first illustrative embodiment, a liquid crystal display apparatus that does not use the horizontal electric field type liquid crystal panel may include one transparent substrate having a transparent conductive layer on one surface thereof; the other one transparent substrate that is arranged to face the one transparent substrate, has a projecting part partially projecting from an end face of the one transparent substrate, maintains liquid crystals between the one transparent substrate and the other one transparent substrate and has a transparent conductive layer on a surface of a side of the projecting part facing the one transparent substrate; and a conductive tape that is stuck over the two transparent substrates and thus electrically connects the two transparent conductive layers. Also, likewise the first illustrative embodiment, any of the two transparent substrate has transparency at parts overlapping with connection parts of the conductive tape and the two transparent conductive layers, when light shield layers are arranged on the surfaces of the two transparent substrates with being adjacent to or partially overlapping with the conductive tape, the light shield layers are provided with light transmission parts at the connection parts, or the outline end faces (boundary of the light shield layer and the light transmission part) of the light shield layer are formed along the outline end faces of the conductive tape. By these configurations, the same effects as the first illustrative embodiment may be basically achieved. In the meantime, regarding the two transparent substrates, the glass is used in the first illustrative embodiment. However, the other material such as transparent plastic, quartz and the like may be also used insomuch as it is transparent and the same effects as the first illustrative embodiment may be basically achieved.

The configurations descried in the liquid crystal display apparatus of the first illustrative embodiment or modified embodiments are just examples, and this disclosure is not limited thereto.

What is claimed is:
1. A liquid crystal display apparatus comprising:
 a color filter substrate including a first transparent substrate, which has:
  an anti-static transparent conductive layer formed in at least a display area on a first surface of the first transparent substrate; and
  a light shield layer that shields light in a frame area arranged outside the display area on a second surface, which is opposite to the first surface;
 a TFT substrate including a second transparent substrate, which maintains liquid crystals in cooperation with the color filter substrate with facing the second surface of the color filter substrate, and which has:
  a projecting part that projects beyond an end face of the color filter substrate;
  a pair of electrodes, which is provided in the display area on a third surface facing the color filter substrate, and which generates an electric field in a direction parallel with the color filter substrate to drive the liquid crystals;
  a TFT, which is provided in the display area provided on a third surface, and which apply the voltage into one of the pair of electrodes; and
  an earth pad, which is provided in the projecting part on the third surface, and which is earth-connected; and
 a conductive tape, which is stuck from an upper part of the color filter substrate to an upper part of the TFT substrate, which is connected to both the anti-static transparent conductive layer and the earth pad to electrically connect the anti-static transparent conductive layer and the earth pad,
 wherein the light shield layer is formed to extend up to an end side of the color filter substrate, which is adjacent to the projecting part,
 wherein the light shield layer has a notch having an opening at the end side of the color filter substrate, which is adjacent to the projecting part,
 wherein the conductive tape is arranged adjacent to or partially overlapping with the light shield layer, wherein the notch is provided at a connection part of the conductive tape and the anti-static transparent conductive layer, and wherein a light transmission part capable of light transmitting is provided to the connection part, and a part of the TFT substrate overlapping with the connection part has transparency.

2. The liquid crystal display apparatus according to claim 1, wherein an outline end face of the light shield layer at the notch part is formed along an outline end face of the conductive tape.

3. The liquid crystal display apparatus according to claim 1, further comprising a polarization plate that is arranged to cover the anti-static transparent conductive layer in at least the display area on the first surface of the color filter substrate, wherein the polarization plate is formed to extend up to an adjacency of the end face of the color filter substrate, which is adjacent to the projecting part, wherein an exposed part of the anti-static transparent conductive layer is formed at an outer side of the polarization plate to not be covered by the polarization plate, wherein the connection part of the conductive tape and the anti-static transparent conductive layer is formed at the exposed part, and the conductive tape is arranged to not overlap with the polarization plate.

4. The liquid crystal display apparatus according to claim 3, wherein an outline end face of the polarization plate is formed along two opposing end faces of an outline of the conductive tape.

5. The liquid crystal display apparatus according to claim 1, further comprising a light shield layer provided in the projecting part on the third surface of the TFT substrate, wherein a light shield layer in the projecting part has an outline end face formed along an outline end face of the conductive tape.

6. The liquid crystal display apparatus according to claim 1, wherein a surface of the earth pad is configured by a transparent conductive layer for earth pad, wherein another light shield layer, which is arranged adjacent to or partially overlapping with the transparent conductive layer for earth pad, is provided on the third surface of the projecting part, and wherein the another light shield layer has a light transmission part capable of light transmitting at a connection part of the conductive tape and the earth pad.

7. The liquid crystal display apparatus according to claim 6, wherein the another light shield layer, which is arranged adjacent to or partially overlapping with the transparent conductive layer for earth pad, is formed so that a boundary of the light shield layer and the light transmission part is formed along an outline end face of the conductive tape.

8. The liquid crystal display apparatus according to claim 6, wherein the another light shield layer, which is arranged adjacent to or partially overlapping with the transparent conductive layer for earth pad, in the projecting part on the third surface has a wiring arranged to bypass so that the light transmission part capable of light transmitting is formed at the connection part of the conductive tape and the earth pad.

9. A liquid crystal display apparatus comprising:

a color filter substrate including a first transparent substrate, which has:
an anti-static transparent conductive layer formed in at least a display area on a first surface of the first transparent substrate; and
a light shield layer that shields light in a frame area arranged outside the display area on a second surface, which is opposite to the first surface;

a TFT substrate including a second transparent substrate, which maintains liquid crystals in cooperation with the color filter substrate with facing the second surface of the color filter substrate, and which has:
a projecting part that projects beyond an end face of the color filter substrate;
a pair of electrodes, which is provided in the display area on a third surface facing the color filter substrate, and which generates an electric field in a direction parallel with the color filter substrate to drive the liquid crystals;
a TFT, which is provided in the display area provided on a third surface, and which apply the voltage into one of the pair of electrodes; and an earth pad, which is provided in the projecting part on the third surface, and which is earth-connected; and a conductive tape, which is stuck from an upper part of the color filter substrate to an upper part of the TFT substrate, which is connected to both the anti-static transparent conductive layer and the earth pad to electrically connect the anti-static transparent conductive layer and the earth pad, wherein a surface of the earth pad is made a transparent conductive layer for earth pad, wherein another light shield layer, which is arranged adjacent to or partially overlapping with the transparent conductive layer for earth pad, is provided on the third surface of the projecting part, and wherein the another light shield layer has a light transmission part capable of light transmitting at a connection part of the conductive tape and the earth pad.

10. The liquid crystal display apparatus according to claim 9, wherein a boundary of the another light shield layer and the light transmission part is formed along an outline end face of the conductive tape.

11. A liquid crystal display apparatus comprising:

a first transparent substrate having a first transparent conductive layer on one surface thereof;

a second transparent substrate, which maintains liquid crystals in cooperate with the first transparent substrate with facing an opposite surface to the one surface of the first transparent substrate, which has:

a projecting part that projects beyond an end face of the first transparent substrate;

a second transparent conductive layer provided in the projecting part on a surface facing the first transparent substrate;

a conductive tape, which is stuck from an upper part of the first transparent substrate to an upper part of the second transparent substrate, which is connected to the first transparent substrate and the second transparent substrate to electrically connect the first transparent substrate and the second transparent substrate;

a light shield layer, which is arranged adjacent to or partially overlapping with the conductive tape, provided on at least one surface of the first transparent substrate and the second transparent substrate; and a light transmission part, which is formed at the light shield layer and is capable of light transmitting at a connection part of the conductive tape and at least one of the first transparent substrate and second transparent substrate.

12. The liquid crystal display apparatus according to claim 11,
wherein an outline end face of the light shield layer is formed along a outline end face of the conductive tape.

* * * * *